Sept. 1, 1959　　　HANS-ULRICH LAUSCHKE　　　2,902,215
PROGRAMMING APPARATUS FOR ACCOUNTING MACHINES
Filed Oct. 15, 1957　　　　　　　　　　　　　　8 Sheets-Sheet 6

Fig. 7

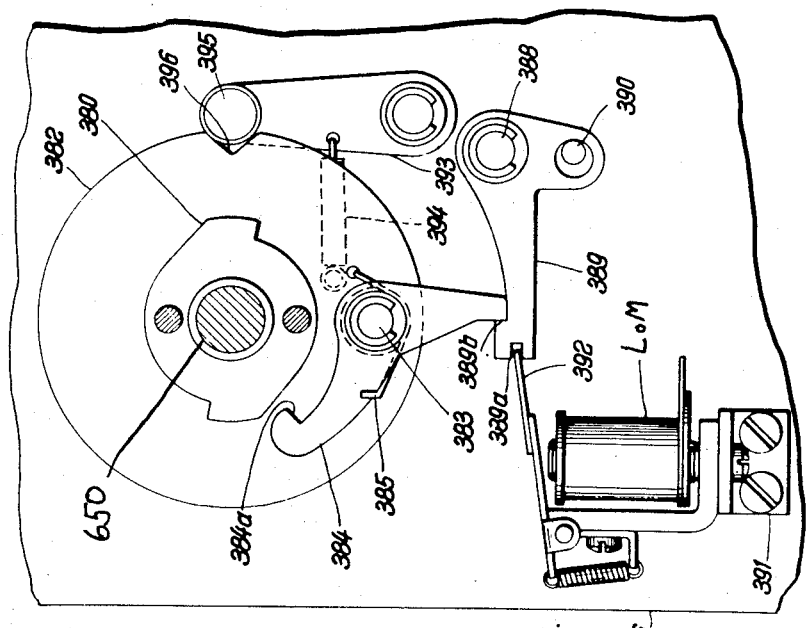
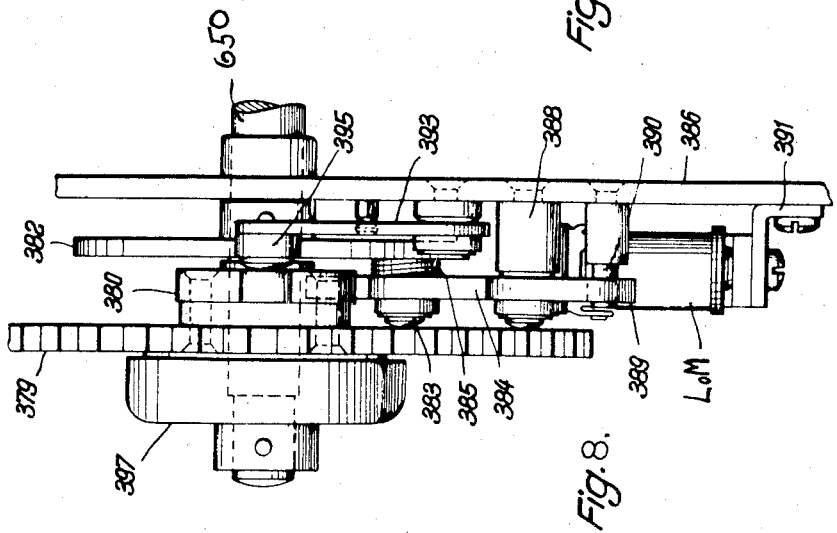

United States Patent Office 2,902,215
Patented Sept. 1, 1959

2,902,215

PROGRAMMING APPARATUS FOR ACCOUNTING MACHINES

Hans-Ulrich Lauschke, Munich, Germany, assignor to Anker-Werke Aktiengesellschaft, Bielefeld, Germany, a German corporation Application October 15, 1957, Serial No. 690,388

Claims priority, application Germany October 18, 1956

12 Claims. (Cl. 235—61.9)

My invention relates to programming apparatus for governing the selective working sequences of accounting machines for operation with data-carrying account cards which exhibit a line-for-line succession of consecutive transactions of an account whose changes are legible from a printed entry and whose last entry always exhibits the latest balance of the account by scannable code marks as well as in print.

Such machines comprise (1) a manually operable keyboard having value-posting keys and program control keys, (2) a sensing apparatus for scanning the marks that denote values and control intelligence on the cards and for transferring the sensed-off information into the machine, (3) computing devices for calculating results from the posted and scanned values and storing the results, (4) marking and printing devices which record the accounting data upon the account card by scannable marks and printed entries and which also serve for the production of journals, statements of account and the like legible records of successive book keeping transactions.

The machines are further equipped with programming apparatus for controlling and properly coordinating the desired functioning of the afore-mentioned sub-systems. The control apparatus in this type of accounting machine "calls," or "occupies," the various coactive sub-systems in the desired sequence by means of electric impulses and supervises the correct system performance, thus automatizing the accounting operation and preventing the occurrence of transferring errors. The automatic control of the machine thus not only combines and correlates the basic operation of the individual sub-systems to secure the desired overall machine performance, but it also suppresses certain partial functions of the sub-systems in dependence upon computed results, or enters other, normally not effective, partial performances into the "called" machine operation, thus enforcing an accurate temporal coordination of the various component system-operations occurring during an accounting run.

This automatic control of the programming apparatus is primarily governed by programming commands given by the selective manual actuation of control keys, and is further under control by internally produced signals such as those issuing from punched holes of the account card. The manual control keys serve for the selection of the desired type of accounting performance, for releasing a machine run, and for entering any accounting magnitudes and legends that are to be newly recorded on the account card and have been previously posted into the keyboard of the machine. The selectively actuated control keys have the function of "calling" or occupying the various sub-systems of the machine in respectively different sequences depending upon the particular accounting run to be performed. The programming apparatus, receiving these control commands from the control keys, then automatically takes care of properly sequencing the operations of the individual sub-systems thus composing these operations to the desired accounting run.

Now, the number of the above-mentioned manual control keys for issuing the primary programming commands is rather limited if it is desired to keep the keyboard of such a machine synoptically simple and sufficiently easy to service to prevent operating errors and delay. The desire for a small number of control keys, of course, can be satisfied by limiting the various types of accounting performance to a few operating sequences. On the other hand, however, a high-quality accounting machine is supposed to be as versatile as possible with respect to its applicability to various accounting requirements.

It is, therefore, an object of my invention to improve such machines by reducing the number of manual program-control keys required for a given number of different accounting runs, without impairing the versatility and operating efficiency of the accounting machine.

Another object of the invention, subsidiary to the one just mentioned, is to improve and simplify the accounting-machine programming apparatus to be governed by the above-mentioned manual program-control keys as well as by scannable marks of the account card and by control signals issuing from the machine sub-systems being programmed. More particularly, the invention aims at devising the programming apparatus in such a manner that the program-control keys, depending upon which of them is being actuated, are selectively placed in connection with the various control devices or monitors of the programming apparatus with the effect that when a particular programming sequence is initiated by actuation of one of the program-control keys, the same sequence can be repeated as often as desired simply by again actuating the same program-control key, while during each such repetition only those partial sequences (sub-sequences) are added to the sequence first performed as are necessary for supplementing the originally initiated sequence.

According to another, more specific feature of the invention, the original or repeated operating sequence is terminated by actuating a different program-control key which normally governs an independent and complete operating sequence of different type. After actuation of the latter control key, the programming apparatus takes only that portion out of the normal operating sequence correlated to the latter key, that is necessary for finishing the previously performed incomplete sequence, whereas the residual partial operations of the normally occurring operating sequence, released by the latter control key, are automatically suppressed.

According to another feature of my invention, I interwire the programming apparatus with appertaining single-item control keys and multiple-item control keys in such a manner that the actuation of a multiple-item control key governs the programming apparatus to perform an incomplete multiple-item accounting sequence which must be completed by subsequently actuating a single-item control key, whereas when the single-item control key is depressed without preceding actuation of a multiple-item control key, the single-item control key will govern the programming apparatus to perform and complete a full sequence of single-item accounting rather than only those accounting steps that are added to a multiple-item accounting sequence when the single-item key is depressed in the course of a multiple-item performance.

More specifically, an independent single-item accounting released by the single-item control key according to the feature of my invention last mentioned, governs the programming apparatus to perform an operating sequence which comprises (1) transferring an account card into the machine, (2) checking of the account card for coincidence of its punched account-number markings with the account number posted into the machine, (3) transferring the card to a position in which the last-entered line of data lies in front of the scanning assembly of the machine, (4) scanning of the old balance from the punched entries on the card, (5) entering the amount of the new transaction into the computing assembly of the machine, (6) computing the new balance, (7) registering the new balance, and (8) discharging the card from the machine. Inserted into this sequence of operation is a time gap required to permit the operator to post any necessary accounting legends. This gap may be provided somewhere between the steps (5) and (7). That is, the programming apparatus will stop automatically when the proper step is completed and will thereafter continue its above-given programming sequence after the operator, upon posting of the legends, actuates a motor-control key also in controlling connection with the programming apparatus.

The above-mentioned multiple-item keys for governing the programming apparatus to perform an incomplete sequence are to be depressed when the operator starts posting the first multiple-item transaction. The programming apparatus, thus set in operation, performs a sequence different from the one described above and comprising (1) transferring the account card into the machine, (2) checking the account card, (3) transferring the account card to place the last-entered line of data in front of the scanning assembly, (4) scanning the old balance, and (5) entering the transaction. This sequence is incomplete because it does not involve computing and entering a balance and discharging the card from the machine. If now the same multiple-item key is again actuated, then it governs the programming apparatus so as to skip the first four steps of the sequence last described and to limit its functioning to step (5), namely the entering of another transaction. When this additional sequence, or any further repetitive sequence as may be desired, is completed, the sequence still remains incomplete. As mentioned above with reference to single-item accounting, the individual partial sequences governed by each actuation of a multiple item key comprise a time gap during which the operator can post any transaction legends, whereafter the sequencing operation of the programming apparatus is continued by actuation of the motor-control key.

For completing the multiple-item accounting, the last transaction is entered into the machine as a single item. That is, the operator actuates the single-item key when posting the last transaction that is to conclude the multiple-item accounting. The single-item key, thus actuated in the course of a multiple-item transaction, then governs the programming apparatus so that it performs only part of the normal single-item sequence, namely only the partial sequence beginning with step (5), namely entering of the last transaction. That is, the partial operations (1) to (4), normally occurring with an individual single-item transaction, are now suppressed and only the single-item steps (7) and (8) are performed and are added to the preceding portion of the multiple-item transaction thus concluding the accounting run.

By thus composing certain accounting sequences from properly selected portions of different other sequences, governed by respectively different control keys, the programming apparatus according to the invention avoids idle runs of the various machine sub-systems and secures a more rapid over-all accounting performance.

As mentioned, the described operating sequences are not always performed in continuous succession of their individual steps but include time gaps. Such gaps may be additionally provided for by giving the programming apparatus further manual control means, for example for the purpose of drawing a sub-total, which cause the programming apparatus to stop. Similarly, the apparatus may be equipped with automatic control devices which interrupt the programming sequence, for example in response to conditions inherent in the accounting operation itself, as is the case when the last available data line of an account card is reached. In the event of such interruption of the programming operation, the operating sequence once commenced is delayed until the inserted intermediate performance is completed, whereafter the programming apparatus, starting at the point of interruption, resumes the original accounting sequence up to completion.

I am aware of the fact that devices for combining different working commands into a composite sequence of operations are known as such. There are known tabulating machines in which plug-in switchboards are used for controlling the course of a desired operating sequence so that the scanning, printing and calculating mechanisms in the machine are called in a sequence predetermined by the plug-in connections made on the switchboard. It has also been proposed to substitute such switchboards by a multiplicity of electric reversing switches. These devices, however are not suitable for the particular problems involved in accounting machines as here dealt with because the known devices permit governing only a limited number of individually complete operating sequences of which only the selected one can be effective at a time, and these devices do not afford an over-riding control by manual control means, and manual inter-action during a pause in the programming sequence once initiated, such as the entering of amounts and legends relating to the accounting operation previously commenced.

There has also become known an accounting machine in which the various operating commands embodied in a programming device can be called by manual control means in different respective sequences. This device, however, possesses the above-mentioned disadvantages that, for performing different accounting runs, a multiplicity of control keys must be actuated simultaneously so that the device, aside from its intricate design and susceptibility to trouble, is often the cause of servicing errors.

The above-mentioned and other objects, advantages and features of my invention, these features being set forth with particularity in the claims annexed hereto, will be apparent from, and will be described in, the following with reference to the embodiment illustrated by way of example on the accompanying drawings in which:

Fig. 7 is an explanatory time chart relating to the operation of the programming apparatus.

Figs. 8 and 9 show a front view and a side view respectively of a single-turn clutch of the type used in the various sub-systems of the accounting machine for controlling each sub-system in response to a control signal received from the programming apparatus.

Figure 6:
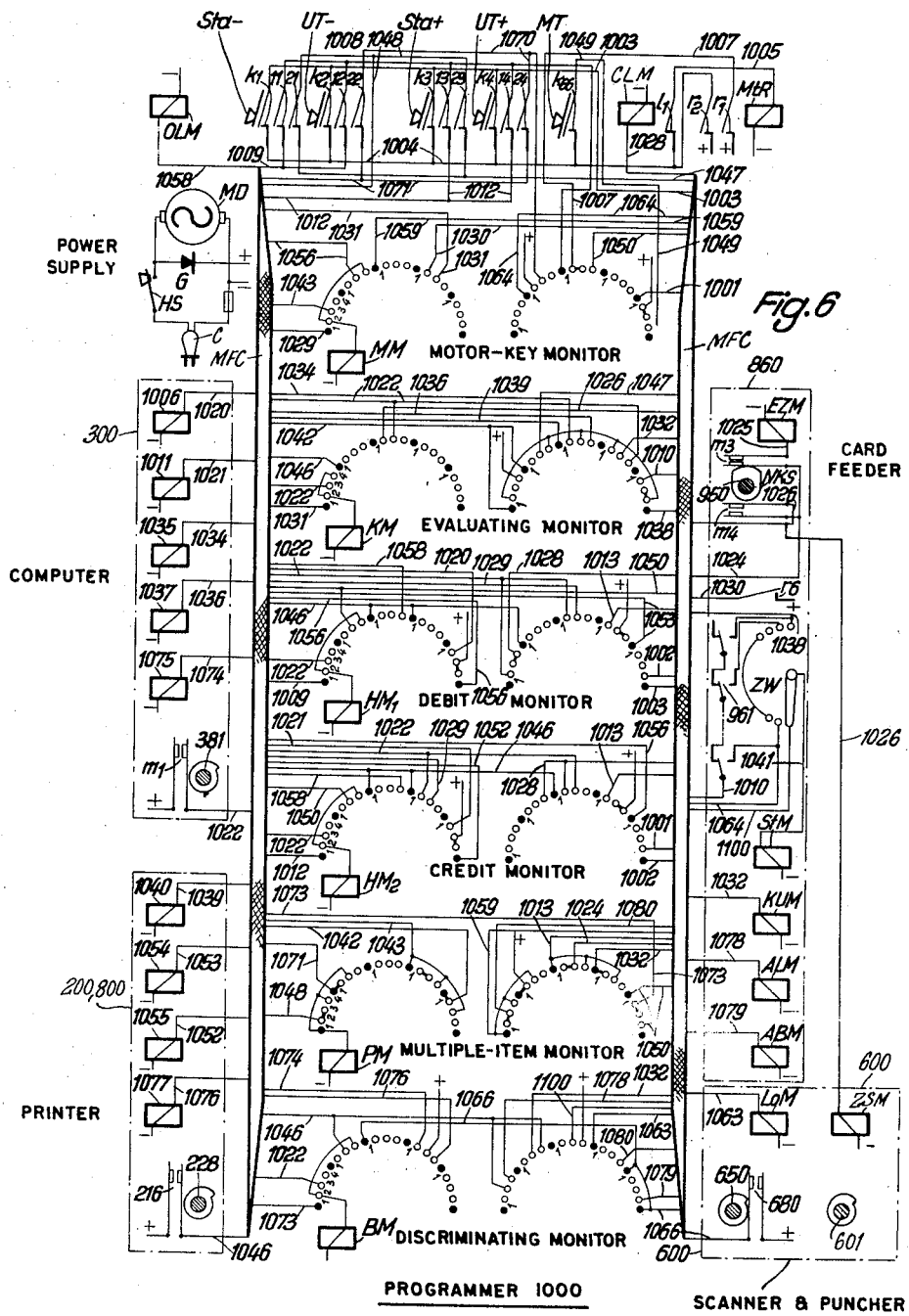
Fig. 6 is a complete schematic circuit diagram of the programming apparatus according to the invention and also shows schematically a number of assemblies or subsystems of the accounting machine controlled by, and cooperating with, the programming apparatus.

On the drawings, the programming apparatus according to the invention is illustrated as a component of a punched-card accounting machine generally of known type. The machine comprises the following main apparatus groups: (1) A computer and data-storer assembly 300, (2) a scanning and punching assembly 600 for scanning intelligence from the account cards and entering new coded data in form of punched holes upon the cards, (3) a journal-printing assembly 200, (4) a card-printing assembly, (5) a card-feeder control assembly 860, (6) a keyboard 1 designed as a ten-keyboard for the posting of accounting values, (7) a keyboard 1a for the posting of programming commands indicative of the desired type of accounting operation and for selectively "calling" the computer mechanism of the computer assembly. The machine is further provided with a programming assembly 1000 for selectively monitoring the cooperation of the above-mentioned other assemblies. Signal lamps L1 to L4 (Figs. 1, 2) are provided for facilitating service and supervision by indicating to the operating person whether the machine is ready for the next following accounting step. The mechanisms of computer assembly 300, the scanning and punching assembly 600, the card- and journal-printing assemblies 200, 800 and the keyboards may be conventional and, since their particular details are not essential to the invention, these assemblies are illustrated and described herein only to the extent necessary for understanding the novel programming apparatus and its connection and coaction with the other assemblies of the machine. If information on further details is desired, reference may be had to the copending application named below in which, generally, the same reference characters are used as in this present disclosure for similar components respectively. However, as far as the coaction of the various assemblies with the programming apparatus according to the invention is concerned, it should be noted that such coaction is effected with the aid of electrical components in each programmed assembly, and these electric components are illustrated in Fig. 6 for each of the assemblies 300, 200/800, 600, 860 coacting with the programming apparatus 1000. As will be more fully explained below, the electric components of the above-mentioned assemblies are "called" under control by the programming apparatus 1000 which in turn is primarily governed by the selective actuation of the control keys on keyboard 1a. These control keys comprise a motor key MT (Figs. 2, 6), a multiple-item credit key UT+, a multiple-item debit key UT—, a single-item credit key Sta+ and a single-item debit key Sta—. In accordance with the particular operating sequence governed by the actuation of the selected control key, the programming apparatus issues switching pulses to the individual assemblies being programmed. Each of the latter assemblies comprises at least one control shaft (228, 381, 601, 650, 950 in Fig. 6) which controls the performance of the assembly and is released to perform a single revolution in response to a switching pulse coming from the programming apparatus. This releasing operation is described below with reference to the example of the scanning and punching assembly 600 shown in Fig. 3 and with reference to the appertaining single-turn clutch shown in Figs. 8 and 9, the single-turn release of each other assembly being effected by similar means in a similar manner.

As shown in Fig. 6, each of the above-mentioned control shafts of the respective assemblies, when "called" by the programming apparatus 1000, actuates a contact which produces a stop pulse when the assembly completes its operation. These stop pulses are supplied to different selector switches or "monitors" of the programming apparatus 1000 where they cause one or more of the monitors to switch into the next position.

Figure 1:
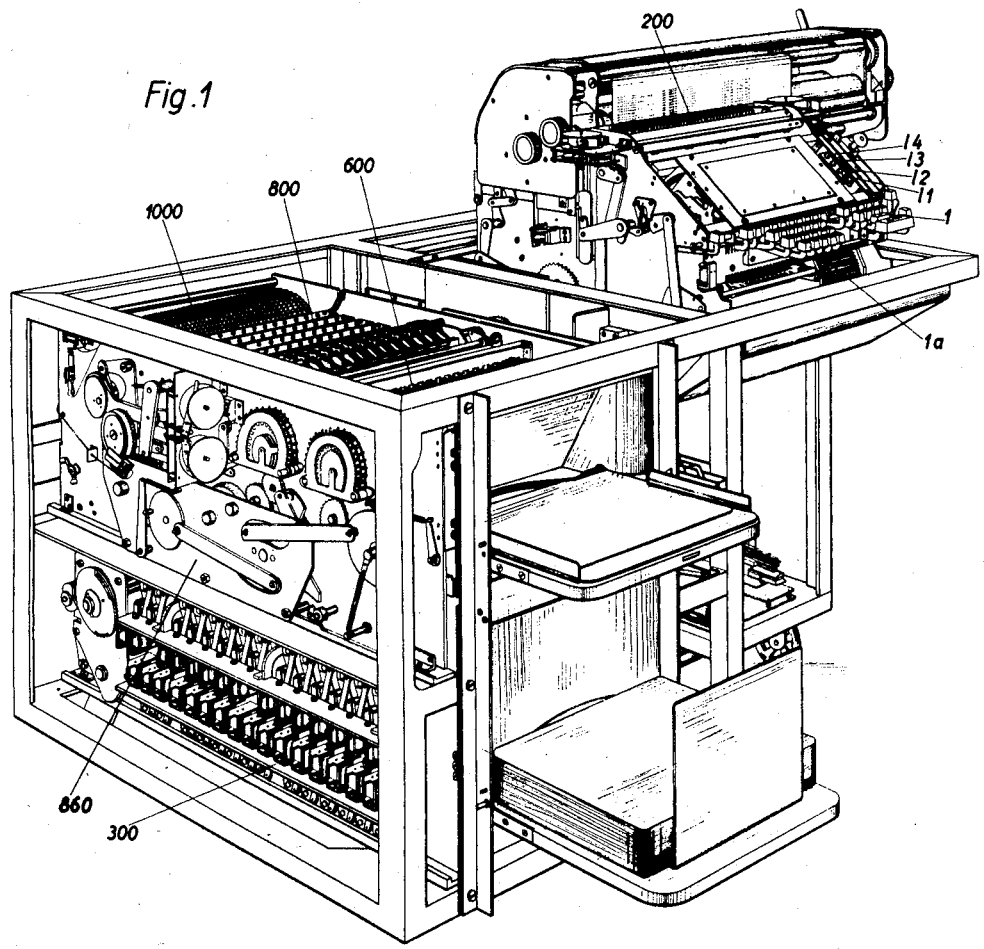
Fig. 1 is a perspective view of a complete accounting machine with parts of the enclosure removed.

Before describing the programming apparatus more in detail, it will be helpful to briefly consider an example of an accounting operation to be performed on the machine shown in Fig. 1. For registering a business transaction the operator places the account card, showing the past history of the particular account in legible form as well as by scannable code holes, upon a card-receiving table T1. The operator further posts into the keyboard the identifying number or symbols of this particular account as well as the data of the new transaction. When the machine is thus set up, the operator depresses one of the control keys of the keyboard 1a depending upon which particular type of operation—such as single-item or multiple-item, credit or debit accounting—is desired. This puts the machine into operation for the selected accounting run. Now, the card is automatically conveyed from table T1 into the interior of the machine where conveying means, such as a card carriage, successively transport the card to the different localities where the individual machine operations, namely scanning, printing and punching, are to be performed. The machine then computes the data of the new transaction together with the old balance data of the account and automatically enters the accounting result on the card in print and also by punching a new hole combination. Simultaneously, the machine prints a legible record of the accounting result into the proper columns of a journal sheet or other record in the upper printer assembly 200. Upon completion of the accounting operation, the card is ejected onto another table or support T2 where, after completion of a number of successive accounting operations, a pile of cards P is collected. A more detailed description of such an accounting run will be given further below.

Figure 4:
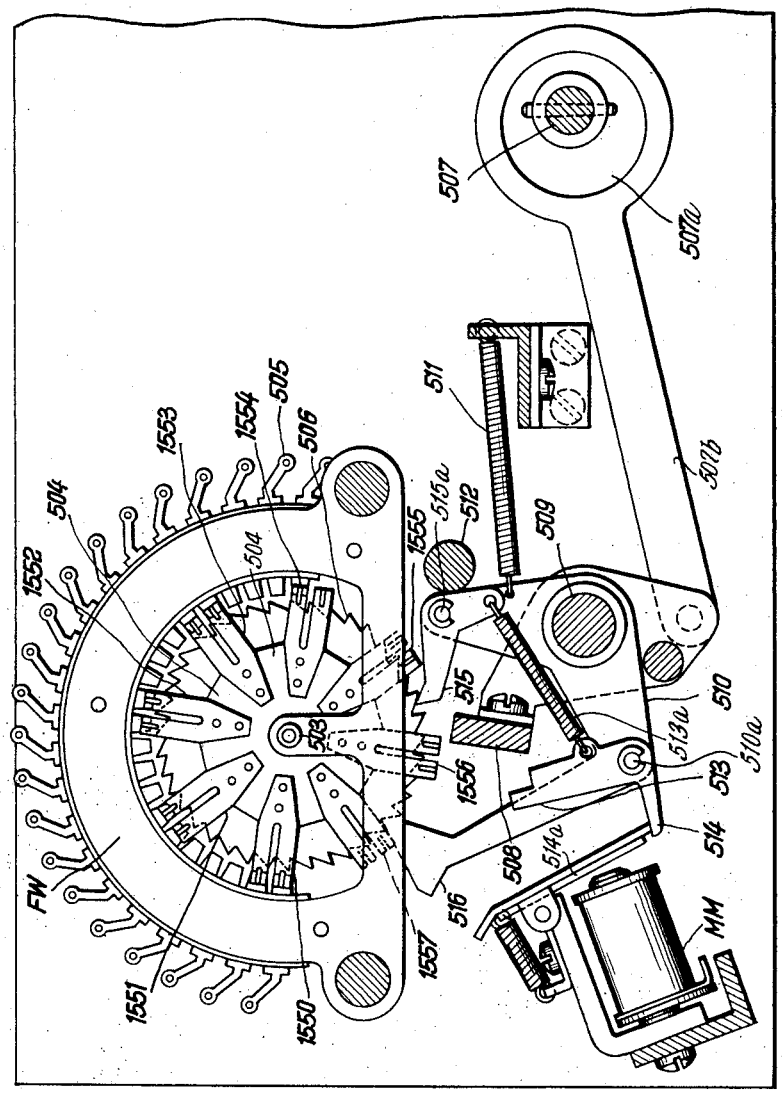
Fig. 4 illustrates, also seen from the left of the machine shown in Fig. 1, one of the monitor switches that form part of the programming apparatus according to the invention proper.

The main power supply of the machine comprises an electric motor MD (Fig. 6, upper left), which is connected to a supply line by means of a plug connector C, and is controlled by a main switch HS. Switch HS is closed, and motor MD is kept running at constant speed as long as the machine is in condition of readiness. Thus, the main shaft 507 (Fig. 4) of the machine, driven by motor MD, revolves continuously. This main shaft supplies power to the above-mentioned control shafts (228, 381, 601, 650, 950 in Fig. 6) of the individual assemblies under control by respective single-turn clutches described below.

The main power supply of the machine also comprises a source of electric control current, preferably direct current. This source is exemplified by a rectifier, schematically shown at G in Fig. 6, which is also connected to the connector C. The positive and negative output poles of the current source are denoted by + and — respectively, and it is to be understood that these two poles are connected by buses (not illustrated) with all leads designated by + and —, respectively, in the circuit diagram of Fig. 6.

Figure 3:
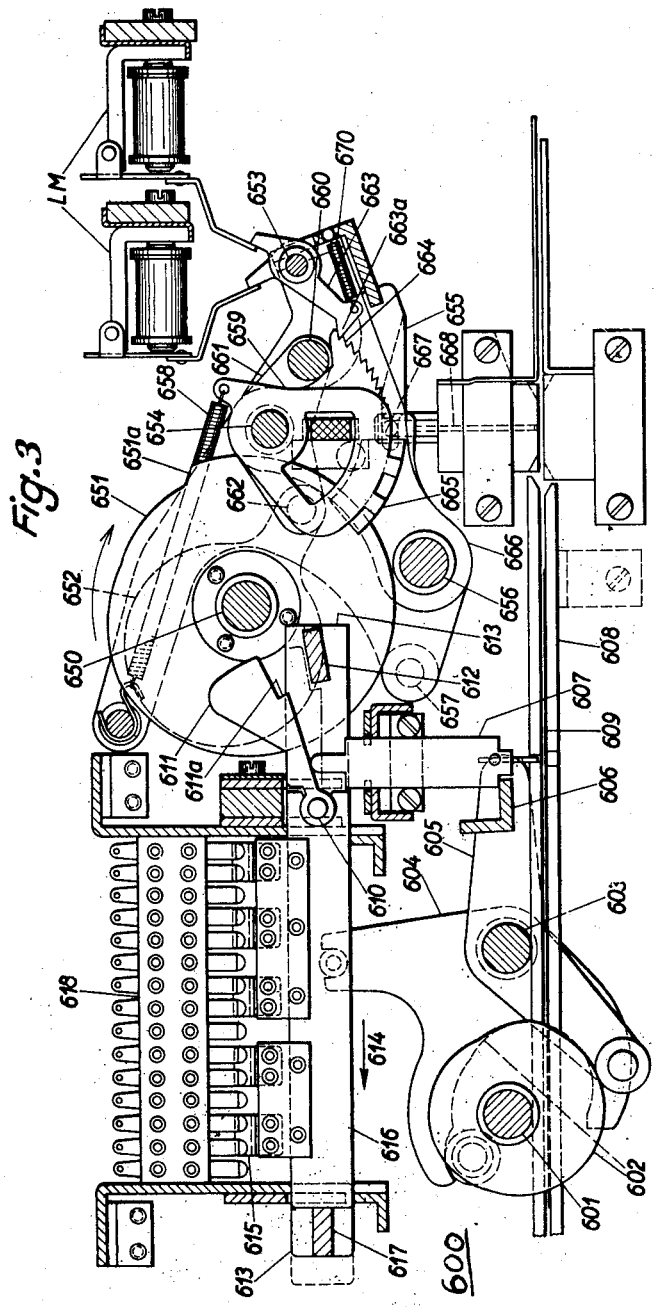
Fig. 3 shows partly in section the scanning and punching assemblies for the sensing and punching of code notations that represent magnitudes and symbols on the account card, the view being from the left of the machine as shown in Fig. 1.

As mentioned, the individual sub-assemblies of the machine are selectively driven from the main shaft under control by respective single-turn clutches. Each of these clutches, when put into action, imparts a single complete revolution to the control shaft of the assembly, under control by a starting pulse received from the programming apparatus. Since the single-turn clutches of the various subassemblies are all of similar design and operation, the mechanical details of only one of them will now be described with reference to Figs. 8 and 9, showing the clutch of the card scanner and puncher assembly 600 (Figs. 1, 3, 6).

The main shaft, continuously driven by motor MD, carries a spur gear (not illustrated) which is in meshing engagement with a spur gear 379 (Fig. 8) of the clutch. Hence, spur gear 379 and a cam 380 rigidly connected therewith rotate continuously about a control shaft 650 (Figs. 3, 8, 9) which forms the main shaft of the card scanner assembly 600. Rigidly mounted on control shaft 650 is a disc 382 (Figs. 8, 9). A pivot pin 383 on disc 382 carries a pawl 384 which is biased toward cam 380 by means of a helical spring 385 surrounding the pivot pin 383. Another pivot pin 388 mounted on a side wall 386 carries a latch lever 389. The pivotal movement of latch lever 389 is limited by a stop pin 390 likewise mounted on wall 386. Wall 386 further carries an angular bracket 391 which firmly supports a puncher control magnet LoM. The armature 392 of the magnet enters into a fork-shaped recess 389a of latch pawl 389.

As long as armature 392 is dropped off, as shown in Fig. 9, a shoulder 389b of latch pawl 389 holds the pawl 384 away from the continuously rotating cam 380, while a detent arm 393 pivoted on wall 386 keeps the disc 382 arrested by means of a roller 395 engaging a notch 396 of disc 382 under the force of a biasing spring 394. When magnet LoM is excited, its armature 392 moves the latch pawl 389 counterclockwise so that pawl 384 is released. The nose 384a of pawl 384 enters into the range of the next cam projection and is then entrained by the rotating cam 380. Now the disc 382 and the puncher control shaft 650 partake in the rotation of the cam 380 for one complete turn, provided the magnet LoM is deenergized sufficiently early so that pawl 384, after completion of one rotation, can again place itself in front of the shouldrer 389b of latch pawl 389.

Added to the single-turn clutch just described is an over-run clutch 397 (Fig. 8) of conventional design. Clutch 397 is interposed between the continuously rotating spur gear 379 and the puncher control shaft 650 to prevent over-running of shaft 650.

Turning now to Fig. 3 it will be described how a single-turn clutch of the above-explained type controls the operation of the appertaining assembly in the accounting machine, the particular assembly here chosen for illustration being a combined scanning and punching apparatus.

The scanning portion of the apparatus is actuated by a control shaft 601. This shaft is driven from the continuously rotating main drive under control by a single-turn clutch of the same design and operation as described above (Figs. 8, 9) with reference to the control shaft 650 of the punching device. Thus, the scanner control shaft 601 (Fig. 3) performs a single revolution clockwise during each cycle of operation. During such operation, two cams 602 on shaft 601 turn two drive levers 604 and two drive levers 605 about their common pivot shaft 603. Mounted on drive levers 605 is an angle rail 606 which normally holds the feeler members 607 raised in inactive position. During the above-described movement of levers 605 about pivot pin 603, the rail 606 is lowered and then permits the feeler members 607 to drop onto an account card 609 located within the card guide 608, so that the feeler pins of member 607 may enter into any holes of the account card 609 that may then be located beneath the feeler pins.

The feeler members 607 are engaged at their respective tops by coupling arms 611 which are pivoted by means of pins 610 to respective sliders 616. The respective coupling arms 611, due to their own weight, follow the downward motion of all lowered feeler members 607 so that a recessed shoulder portion 611a of each lowered arm enters into engagement with a cross bar 612 which forms part of a driving frame 613. When the drive levers 604 impart to the driving frame 613 a displacing motion in the direction of the arrow 614, the cross bar 612 displaces only those adjusting sliders 616 that are then coupled with cross bar 612 by the respective arms 611. The other sliders 616 whose coupling arms 611 remain in the inactive position because the feeler pins of appertaining feeler members 607 are not in registry with punched places of the account card and thus remain raised, are not in engagement with the cross bar 612 and therefore remain in the normal position illustrated in Fig. 3. Each of sliders 616 carries a set of movable contacts 615 to cooperate with a set 618 of stationary contact springs.

During the further course of rotation of the main control shaft 601, the angle rail 606 on driving levers 605 is active to return the feeler members 607 and thus also the coupling arm 611 into the inactive position shown in Fig. 3. The drive levers 604 also return the driving frame 613 to the position of rest and, through a cross bar 617, also the previously displaced adjusting sliders 617.

By the operation of the devices just described, the values or other symbols represented on the account cards in form of punched-hole combinations are translated into electric circuit connections between the contacts 615 and 618 which are transferred into the storer assembly 300 (Figs. 1, 6) prior to zeroing of the scanning device in a manner explained in a later place.

As mentioned, the control shaft 650 of the puncher assembly is released for a single-turn run by operation of the control magnet LoM (Figs. 3, 6, 8, 9). Ridigly mounted on the puncher control shaft 650 (Fig. 3) are two cam discs 651 and two eccentric drive members 652. A puncher frame 655, formed of two side parts and two shafts 653, 654, has a fixed pivot shaft 656 and is normally held in inactive position by means of two rollers 657 mounted on the respective side parts of the puncher frame and resting against the respective cam discs 651. A number of puncher segments 659 are rotatably mounted side by side upon the shaft 654 and are individually biased counter-clockwise by respective springs 658. A switching frame 661 is formed by two angle pieces rotatably mounted on shaft 654 and a cross bar 660. Frame 661 normally maintains the puncher segments 659 in the inactive position of rest illustrated in Fig. 3, due to the fact that the switching frame 661 is kept in its blocking position by means of the eccentric drive members 652 and is linked together with frame 661 by means of pivot pins 662.

Rotatably mounted on shaft 653 are a number of stop pawls 663 which are correlated to the respective puncher segments 659. The stop pawls 663 can enter their respective noses 663a into the stop rack 664 of the respective puncher segments 659 when these racks are turned clockwise about their pivot shaft 653 by means of the stop magnets LM which are excited in a given time sequence. Each rack 664 has ten teeth. The puncher segments 659 carry respective selector pieces 665 which are shaped in accordance with the selected code combination. The selector pieces 665 cooperate, by means of an appertaining frame 666 pinned upon shaft 656, with punch pins 668 guided by a shaft 667.

When the control shaft 650 is being driven clockwise, the eccentric drive members 652 turn the switching frame 661 counter-clockwise about pivot shaft 654 so that the puncher segments 659 likewise are turned counter-clockwise by their respective springs 658. This motion continues until the puncher segments 659 are arrested by the appertaining pawls 663 under control by the stop magnets LM. The puncher segments 659 not so arrested continue to move into an inactive limit position. Near the end of this adjusting motion, the link pins 662 of the eccentric drive 652 have reached an abutment (not illustrated) in the puncher frame 655 and, during further progress of their motion, turn the frame 655 clockwise about the pivot axis while the rollers 667 pass along the stepped contour portion of cam disc 651. This causes the arrested puncher segments 659 and the appertaining respective selector pieces 665 to move the selected punch pins 668 downwardly with respect to the illustration in Fig. 3, so that the account card 609 then located in the range of the punch pins is provided with punched holes corresponding to the desired value-denoting code combination. During further progress of the revolution of main control shaft 650, the eccentric drives 652 and cam discs 651 are effective to return the puncher frame 655 and thus also the frame 666 carrying the punch pins 668, into the normal position, so that the punch pins 668 again assume the starting position shown in Fig. 3. The pins 662 are also active to return the switching frame 661 to the starting position so that the puncher segments 655, in opposition to the force of their respective springs 658, are also reset to starting position. The stop pawls 663 then follow the pulling force of the appertaining springs 670 and, by virtue of the particular shape of the rack teeth 664, also return to starting position.

The single revolution of the puncher control shaft 650 is thus terminated; and all previously displaced parts of the puncher assembly are again ready in their respective starting positions.

It should be understood that the details of the above-described scanner and puncher assembly and of the single-turn clutch are not essential to the present invention proper. As a matter of fact, these components are in accordance with the copending application Serial No. 651,381 of Johannes Sobisch et al., filed April 8, 1957. They are here presented mainly as an example of a performance carried out under control by the clutch-releasing control magnets and the control shafts shown in Fig. 6 as parts of the subassemblies 300, 200/800, 600 and 860. For that reason, only a brief description will be given below relative to some of the other assemblies that cooperate with the programming apparatus according to the invention but whose details of construction are not essential to the invention proper.

The programming apparatus 1000 (Figs. 1, 4, 6) which controls the pulses for monitoring the other assemblies of the machine comprises a number of selector switches FW of the stepping-switch type (Fig. 4) hereinafter also called "monitors." These monitoring switches are likewise connectable with the machine main shaft by means of a switching magnet such as the magnet MM (Figs. 4, 6) which is excited by a switching pulse and then causes the stepping mechanism of the monitor to progress one step at a time. A number of mutually insulated bank contacts 505 (Fig. 4) are mounted along the travel path of each monitoring switch. The central shaft 503 of the switch carries a rotatable disc 504 on which a number of contact spoons 1550 to 1557 are mounted and insulated from each other. Each individual contact spoon forms a conductive connection between two adjacent bank contacts 505. The insulating disc 504 is firmly connected with a ratchet 506 which serves to impart stepwise rotation to the disc and contact spoons. Due to the uniform distribution of the contact spoons over the periphery of the insulating disc, the switch reaches its original starting position after performing a given number of individual steps. The particular stepping switch shown in Fig. 4 thus returns to the starting position after performing five progressive switching steps.

The stepping switch is driven from the continuously revolving main drive shaft 507 of the machine. Shaft 507 carries an eccentric 507a which, by means of a linking rod 507b, imparts continuous reciprocating movement to a swing beam 508 rotatably mounted on a shaft 509. Also mounted on shaft 509 is a pawl carrier 510 which is biased by a spring 511 into engagement with a stop pin 512. A latch pawl 513, pivoted on carrier 510 at 510a, has a lug 514 in engagement with the armature 514a of a magnet MM as long as the armature is in the dropped-off position shown in Fig. 4. The armature then keeps pawl 513 out of the oscillating range of swing beam 508.

When magnet MM is excited by a starting pulse, produced, for instance, by actuation of one of the control keys 1a (Figs. 1, 2), the armature 514a is withdrawn from lug 514, and a spring 513a turns the latch pawl 513 into the stroke range of swing beam 508 so that the pawl carrier 510 participates in the oscillatory motion of the swing beam. Now a driver pawl 515, pivoted at 515a to the pawl carrier 510, enters into the teeth of ratchet 506 and advances it one tooth division while a detent arm 516 of pawl carrier 510 simultaneously releases the ratchet 506. If the magnet MM, during the return stroke of the swing beam 508, is again deenergized, the lug 514 of latch pawl 513 places itself in front of the armature 514a, and the switching operation of the selector switch is terminated.

A monitor switch of the type described may be provided with one or several rows of bank contacts in coaxial relation to each other. Thus, the stepping magnet of each monitor switch shown in Fig. 6 actuates two rows of bank contacts simultaneously.

In the programming apparatus according to the embodiment exemplified in Fig. 6, a total of six monitors are provided. The individual monitors are designated by legends indicative of their particular programming function. They comprise a motor-key monitor whose stepping magnet is denoted by MM as in Fig. 4, a card-evaluating monitor with a stepping magnet KM, a credit monitor with a stepping magnet $HM_1$, a debit monitor with a magnet $HM_2$, a multiple-item monitor with a magnet PM, and a discriminating monitor with a magnet BM. The individual monitors operate to selectively connect the electric leads coming from, and leading to, the different operating assemblies of the machine with one another in a manner predetermined by the actuation of a selected control key, so that the individual assemblies function in a prescribed sequence to obtain the desired series of memorizing, computing and registering operations.

For lucid illustration, the individual bank contacts 505 (Fig. 4) of the monitor switches are shown in Fig. 6 simply as dots arranged on a semicircle. The contact spoons 1550 (Fig. 4), for the same reason, are not illustrated in Fig. 6, but it will be remembered that the contact spoons in each monitor always connect two immediately adjacent bank contacts (505) with each other. Thus, when the individual monitors according to Fig. 6 are in base position, each contact shown by a block dot is connected with the clockwise adjacent contact shown by a circle. Also in Fig. 6, the different switching positions of each monitor are consecutively numbered 1, 2, 3 and 4. The switching steps of these monitors are further apparent from the operating chart shown in Fig. 7. For example, in the second position of any one of the monitors (Fig. 6) the contact spoons (1550 in Fig. 4) always connect the contact adjacent to the number 2 with the clockwise adjacent contact 3, and so forth.

Figure 2:
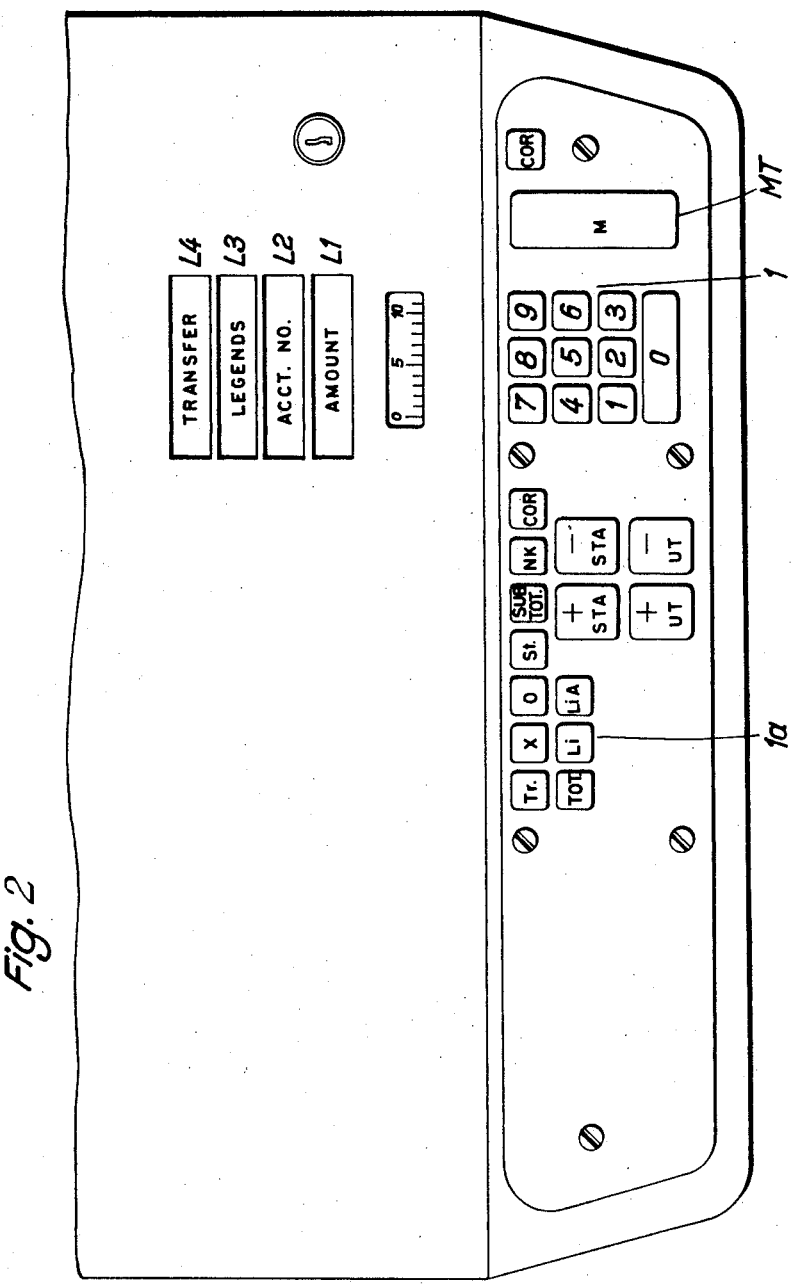
Fig. 2 is a top view onto part of the keyboard of the machine.

As mentioned, the operation of the monitors in the programming apparatus is governed by the selectively actuatable control keys UT+, UT−, Sta+, and Sta− (Figs. 2, 6). Each of these keys, when depressed, closes a group of normally open contacts $k_4$, $k_{14}$, $k_{24}$ or $k_2$, $k_{12}$, $k_{22}$ or $k_3$, $k_{13}$, $k_{23}$ or $k_1$, $k_{11}$, $k_{21}$ (Fig. 6). Each control key, when depressed, remains locked in position until a clearing magnet OLM (Fig. 6, upper left) releases the key under control by a voltage pulse supplied to the magnet.

The control keys UT+, UT−, Sta+, Sta− also serve for selectively calling the respective adding mechanisms of the computer and storer assembly 300 (Figs. 1, 6). While the details of the computer and storer assembly, other than those mentioned below, are not essential to the present invention, a computer assembly as illustrated and described in the copending application of Johannes Sobisch et al., Serial No. 624,241, filed November 26, 1956, is applicable for the purpose of the present invention. The computer-storer assembly 300 is actuated by the above-mentioned control shaft 381 (Fig. 6, left middle) which is connected at the proper time to the continuously rotating main drive of the machine by means of a single-turn clutch as described above with reference to Figs. 8 and 9. Shortly before the computer control shaft 381 terminates its revolution, a cam mounted on the shaft closes a contact $m_1$ which passes a stop pulse through a lead 1022 to the program apparatus 1000. This stop pulse is hereinafter referred to as "delayed storer pulse." The computer-storer assembly is provided with control magnets 1006, 1011, 1035, 1037 (Fig. 6) which serve for selectively actuating the various computing and storing devices of the assembly as will be more fully described below.

Figure 5:
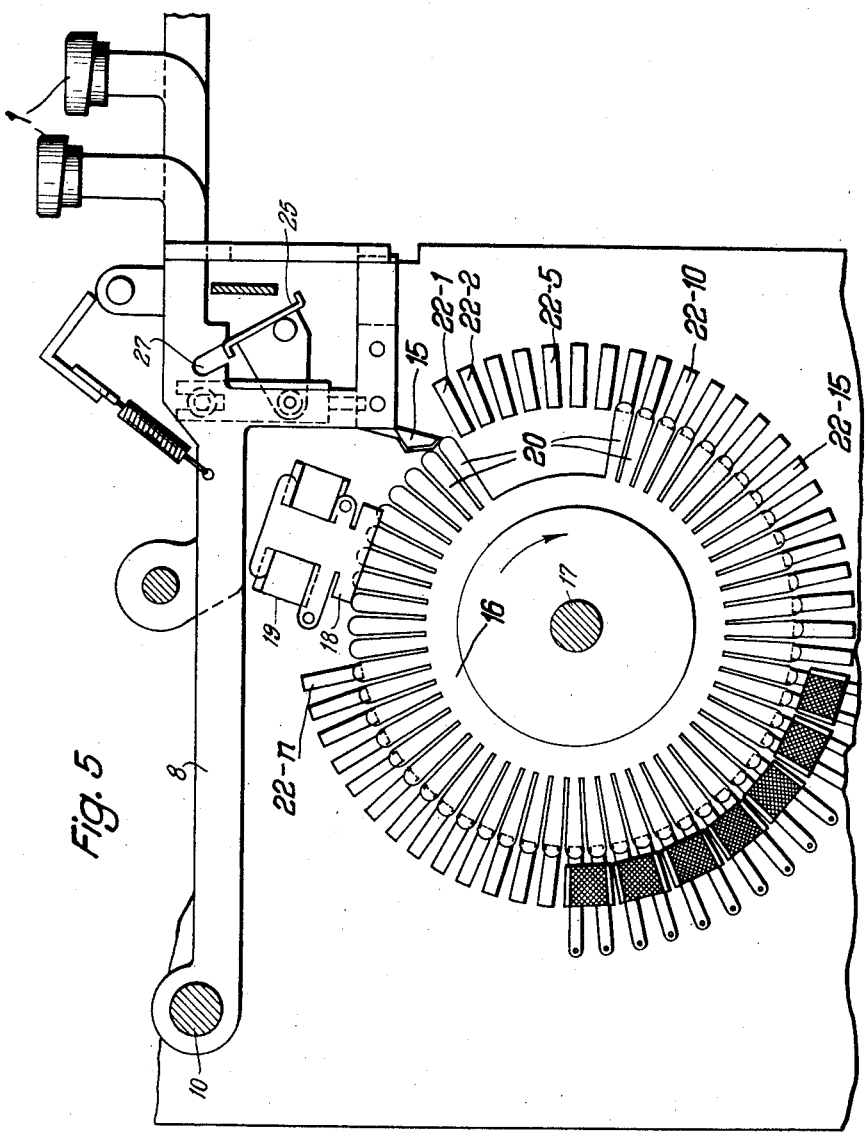
Fig. 5 is a partial view of a device for the posting and storing of amounts and other accounting data, seen from the same side as Figs. 3 and 4.

The computer-storer assembly 300 is provided with means for storing computed magnitudes. In addition, the machine is also equipped with devices for temporarily storing numerical and other accounting data posted into the machine by means of the keyboard 1. The keyboard-controlled storing devices used in the illustrated embodiment are in accordance with those shown and described in U.S. Patent 2,765,116 of J. Sobisch. However, one of the storing devices will be briefly described presently with reference to Fig. 5.

It will be remembered that the keys of the keyboard portion 1 serve to post into the machine the amounts of a transaction as well as any appertaining legends. Each of the keys 1 (Fig. 5) has an arm 8 pivoted at 10 and equipped with a slide cam 15. The storing device comprises a number of contact stars 16 of spring material, one being correlated to each of the respective key levers 8. Each star has a multitude of axially deflectable tongues 20. All contact stars are coaxially mounted on a common shaft 17 and are insulated from the shaft as well as from each other. Each contact star is slidably engaged by a stationary electric terminal contact 18 for connection of the contact star into a control circuit. The terminal contacts 18 are insulated from each other and are mounted on insulating carriers 19. Each terminal contact 18 is always in conductive connection with several contact tongues 20 of the appertaining contact star 16.

The shaft 17 and the entire group of contact stars 16 mounted thereon form together a rotor assembly which is rotated one angular division, corresponding to that of the tongues 20, whenever any one of the key levers 8 is actuated. A group of contact bars 22–1 to 22–15 and so forth, each extending parallel to the axis of shaft 17, are serially aligend along the major portion of the periphery. During the incremental movement of the contact star assembly, the tongues 20 of the contact stars are normally free to pass by the contact bars without touching them. Consequently, no electric contact is made between the tongues 20 and the contact bars unless a tongue is deflected laterally, i.e. in the axial direction of shaft 17, in which this tongue establishes a conductive connection with the contact bars.

Whenever any one of the keys 1 is being depressed, a pivotally mounted teeter rail 25 enters into a slanting recess 27 of that key bar, and the teeter bar is turned slightly counter-clockwise. This prevents the subsequent actuation of any other key 1 so that the teeter bar operates as an interlock. The one key being depressed, forces its slide cam 15 into the path of the contact stars 16 as these stars are being moved clockwise by rotation of the shaft 17. As a result, one of the turns 20 of each contact star enters into contact with the contact bars 22. The rotation of the contact star, released by the actuation of the key, includes only one step forward. During the next following advancing step of the contact star assembly, controlled by the actuation of either the same key or any other key of board 1, the first established contact moves from bar 22–1 to bar 22–2 and so forth, while a new contact engagement of a selected contact star with the first bar 22–1 is effected. In this manner, the data entered into the machine by actuation of the keyboard are stored in the proper sequence and are available for the control and actuation of a subsequently operating machine assembly at any desired moment.

Generally, the just-mentioned sequence of electric contacts represents essentially a cross-bar distributor in which the posted accounting data are represented by a corresponding combination of electric circuit connections.

The above-described device, hereinafter referred to as "amount storer," is cleared by operation of a clearing magnet CLM (Fig. 6, upper right) which operates to couple the storer shaft 17 with the continuously rotating main drive of the machine, thus turning the contact star assembly into the base position.

The card-feeder assembly 860 (Figs. 1, 6), which in the illustrated accounting machine controls the card-conveying travel from the lay-on table T1 (Fig. 1) of the accounting machine to the various processing locations and which causes depositing of the completely processed card onto the receiving table T2, is in accordance with the card-feeder devices illustrated and described in the copending application of Johannes Sobisch et al., Serial No. 651,381, filed April 8, 1957, but will be presently described with respect to its essential components that are to cooperate with the programming apparatus according to the invention.

The card-feeder control assembly 860 (Fig. 6) performs each individual step or feeding operation under control by the feeder control shaft 950 which is connected to the continuously running main drive of the machine by one of the above-described single-turn clutches under control by the clutch magnet EZM (Fig. 6, lower right). At the beginning of an accounting operation the account card, placed by the operator upon the lay-on table T1, is first conveyed by a driven conveying means such as a carriage structure (not illustrated) into the active position of the scanning, printing and punching components of the machine. The feeder control shaft 950 carries a cam NKS which closes a contact $m_3$ in the starting position of the shaft. When the magnet EZM is excited in the manner still to be described, the shaft 950, during a first portion of its rotation, causes the account card to be pulled from table T1 (Fig. 1) into the machine while the cam shaft performs a partial rotation amounting to 180°. As a result, a normally open contact $m_4$ (Fig. 6) is closed and the previously closed contact $m_3$ is opened.

After the account card, by operation of feeder control shaft 950, is moved from the lay-on table into the conveying means within the machine, a checking device (not illustrated but described in the said application Serial No. 651,381) checks the head punchings of the account card as to whether the account number of this card is in accordance with the one posted by the operator into the keyboard. If the checking result is positive, a testing relay represented in Fig. 6 by its contact $r_6$ (extreme right, middle) closes and passes a positive switching pulse through a lead 1030 into the monitoring switches of the programming apparatus 1000.

The account card, now introduced into the machine, is further checked by a line-finder device 961 (Fig. 6, right, middle) as to the number of previously entered lines of data. The line finder 961 comprises a number of series connected reversing switches each of which, when the travelling card has a hole at the location of the scanning member, is caused to move into its other switching position. The individual reversing switches of the line finders 961 are connected to the bank contact of a line selector switch ZW whose contact arm travels in synchronism with the card conveying motion. When the contact arm of selector ZW reaches the one bank contact whose position indicates the first vacant line on the account card, a pulse passes through the selector switch ZW and through a lead 1041 to a stopping device S$t$M which arrests the card conveying travel.

The card conveying device, such as the above-mentioned carriage, is operated by being connected to the machine main drive under control by a feeder control magnet KUM which likewise releases a single-turn clutch of the type described above. This causes the card to be conveyed in the forward direction. The card travel is then stopped in the desired position, depending upon the location of the next accounting step to be performed by the machine assemblies, by control pulses produced by the line finder device 961 or by the monitors of the programming assembly 1000. These pulses pass through line selector switch ZW and through lead 1041 to the above-mentioned stopping device S$t$M which arrests the card carriage by means of suitable stop members (not illustrated).

After the accounting operation is completed, the processed account card is discharged from the machine onto the receiving table T2 (Fig. 1). For this purpose an ejector control magnet ABM (Fig. 6, lower right) is excited in the manner still to be described. The magnet ABM again connects, by means of a single-turn clutch, the feeder control shaft 950 with the main drive so that this shaft now completes its previously started revolution and thus causes the card to be conveyed by feed rollers (not illustrated) onto the table T2. Now the contacts $m_3$ and $m_4$ again occupy the contact positions illustrated in Fig. 6.

As mentioned above, the puncher assembly 600 is in operation during the single-turn revolution of its control shaft 650 initiated by the puncher control magnet LoM. During the period of this operation, the accounting data kept ready in the computer-storer assembly 300 of the machine, are punched into the account card then located in front of the punching device. The stop pulse produced by contacts 680 when the punching operation is completed, is utilized in the programming apparatus for resetting various control devices to zero as will be described further below.

The journal-printing and card-printing assemblies 200 and 800 (Figs. 1, 6) of the illustrated machine are in accordance with those illustrated and described in the copending application Serial No. 624,241 above mentioned. Each of these printing assemblies comprises a bank of type carriers so that all printing-type members placed into printing position are simultaneously imprinted. The control shaft 228 (Fig. 6, left, lower corner) which controls the operation of the printing assemblies 200, 800 is connected to the continuously rotating machine drive by a single-turn clutch as described above, under control by any one of the control magnets 1040, 1054, 1055 and 1077. These magnets also select the particular columns on the account card and the journal to be imprinted, depending upon which particular one magnet is excited at a time. This selection will be described below in conjunction with the operation of the programming apparatus as a whole. During the single-turn revolution of the printer control shaft 228 the data stored in the computer-storer and in the amount-storer devices of the machine are imprinted. Shortly before the printer control shaft 228 completes its revolution, it closes the contact 216 and thus supplies to the programming apparatus a stop pulse which serves for initiating the next following programming operations as will be described below.

Further details of the programming apparatus according to the invention, forming part of the illustrated accounting machine, as well as the performance of the apparatus will now be described with reference to examples of accounting runs involving multiple-item and single-item transactions.

In the initial, idle condition of the accounting machine, all monitors of the programmer 1000 are set to zero; that is, the appertaining contact spoons 1550 (Fig. 4; not shown in Fig. 6) are in base position where each bank contact denoted by 1 in each monitor is connected by a contact spoon with the clockwise adjacent bank contact. Before actuating any key, the operator closes the main switch HS (Fig. 6, upper left) which causes the motor MD to maintain the main shaft or shafts of the machine in continuous rotation and hence ready for imparting single-turn revolution to the above-mentioned control shafts. Simultaneously, the direct-current source energizes the positive and negative buses of the control system.

Figure 7:
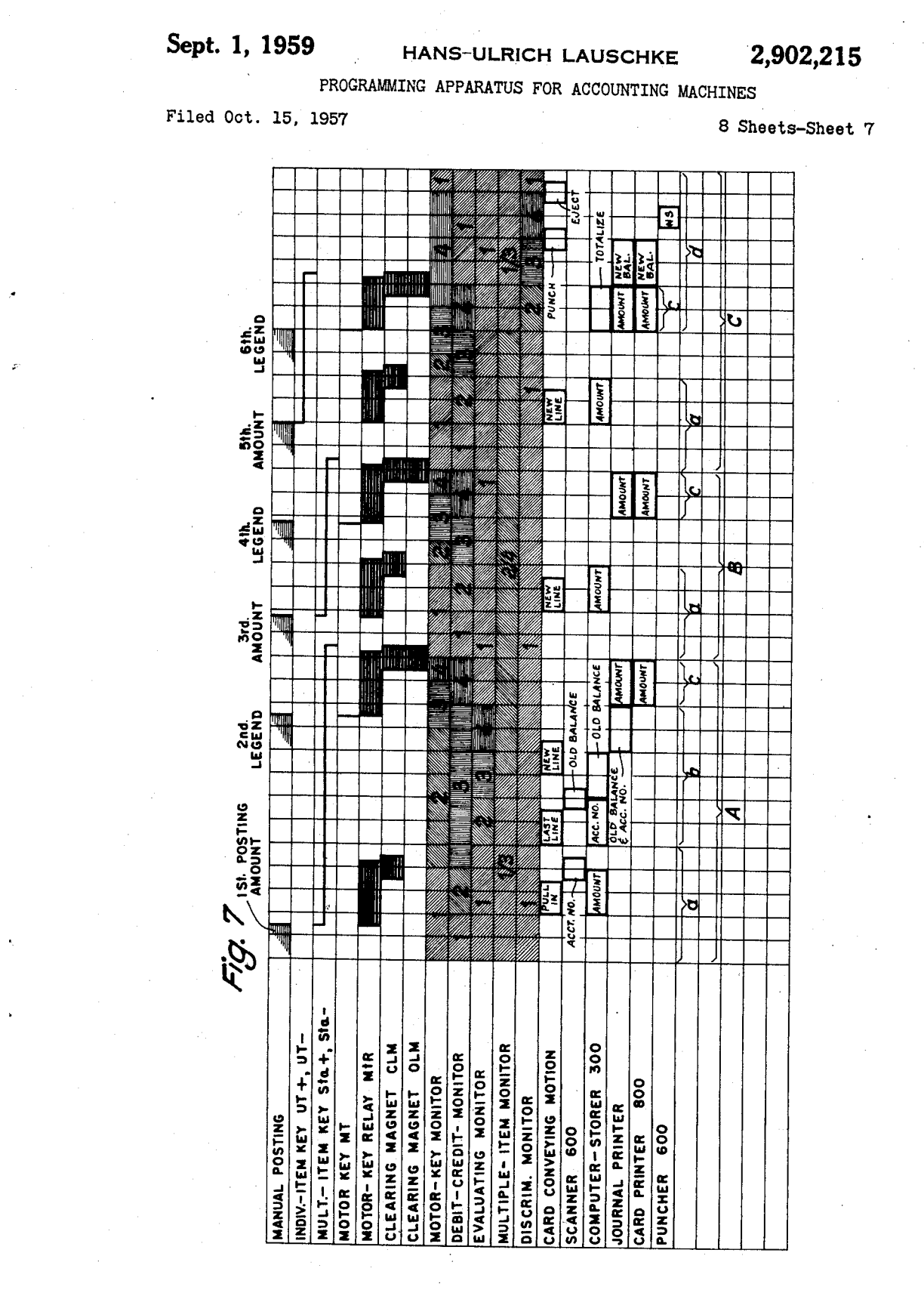

With the machine thus placed in readiness, the operator first posts the amount of the transaction into the keyboard by actuating the keys 1 (first posting in top row of Fig. 7). The posted amount is stored in the machine by means of the amount-storer devices which convert each posted digit into a corresponding circuit connection as described above with reference to Fig. 5.

After thus posting the amount, the operator depresses one of the control keys of keyboard portion 1a. Assume that a multiple-item is to be registered as a debit value. Then the key S$ta-$ (Fig. 3, and Fig. 6, upper left) is to be depressed. The key then stays depressed and is thereafter released only when the clearing magnet OLM is energized. Key S$ta-$ closes its contacts $k_1$, $k_{11}$, $k_{21}$. Contact $k_1$ energizes the motor-key relay M$t$R in a circuit extending from the minus pole of relay M$t$R as follows: (−), M$t$R, lead 1005, contact $l_1$ of clearing relay CLM, lead 1004, contact $k_1$, lead 1003—1003, debit monitor, lead 1002—1002, credit monitor, 1001—1001, motor-key monitor, (+).

In the foregoing and hereinafter, the hyphen-connected repetition of a reference numeral denoting a lead serves to indicate that this particular connection extends through one of the manifold cables or "trees" of wiring denoted by MFC.

The motor-key relay M$t$R, thus energized, closes its contacts $r_1$ and $r_2$. Closed contact $r_2$ completes a self-holding circuit for the motor-key relay M$t$R so that relay M$t$R remains picked up after contact $k_1$ of key S$ta-$ opens. Contact $r_1$ of relay M$t$R passes a switching pulse to the stepping magnet HM$_1$ of the debit monitor in the circuit: (+), $r_1$, lead 1007 and through the motor-key monitor now in its base position, thence through lead 1008, contact $k_{11}$ and lead 1009—1009 (Fig. 6 upper left and middle left) to stepping magnet HM$_1$, (−). Stepping magnet HM$_1$ causes the debit monitor to advance one step into its second position in the manner described in the foregoing with reference to the motor-key monitor illustrated in Fig. 4. Now, the contact spoons (505 in Fig. 4) in the debit monitor connect each bank contact 2 with the clockwise adjacent bank contact. The debit monitor controls the wiring required for entering into the computing and storing assembly 300 the amount of the transaction previously posted into the machine by means of the keyboard 1. This is done by the following switching operations:

The debit monitor, now in second position, passes from its minus pole and through the lead 1020—1020 a pulse to the control magnet 1006 of the computer control assembly 300, and control magnet 1006 is now effective to cause a negative entering of the posted amounts into the selected computer and storer mechanisms. Simultaneously, the single-turn clutch of the computer assembly 300 is actuated, thus operating the control shaft 381 of the computer assembly for one full revolution, during which the computer mechanisms perform their computing operation. Shortly before the computer control shaft 381 completes its revolution, the contact $m_1$ produces the delayed storer pulse. This pulse passes through (+), $m_1$, 1022—1022 to the debit monitor and through its stepping magnet HM$_1$ to the negative pole. This causes the debit monitor to advance to third position.

Before this happens, and while the debit monitor is still in second position, a pulse passes from (+) through lead 1013—1013 to the multiple-item monitor now still in base position, and thence through lead 1024—1024, closed contact $m_3$ (Fig. 6 upper right) of the card feeder control 860, and through the lead 1025 to the control magnet EZM. Magnet EZM controls the single-turn clutch of the card-feeder control shaft 950 which performs a single revolution. As a result, the account card placed upon the lay-on table T1 of the machine is pulled in and is conveyed to the interior conveying means or card carriage of the machine. The cam NKS on the card feeder control shaft 950 now closes contact $m_4$ and opens contact $m_3$. The positive pulse arriving through lead 1024 now passes through closed contact $m_4$ and lead 1026 to the control magnet ZSM which actuates the single-turn clutch of the scanner control shaft 601 (Figs. 6, 3). During this revolution, the scanning assembly of the accounting machine operates as described above to scan the punchings in the head portion of the accounting card comprising an account number and any other characterizing data of the particular account.

The above-mentioned delayed storer pulse, which shortly before the computer control shaft 381 completes its revolution, is supplied to the credit monitor through lead 1022—1022 while the debit monitor is still in second position, passes from the debit monitor through lead 1028—1028 to the clearing magnet CLM (Fig. 6 upper right). Magnet CLM opens its contact $l_1$ and also causes the magnitude storer to be reset to zero as described above with reference to Fig. 5. The opening of contact $l_1$ interrupts the self-holding circuit of the motor-key relay M$t$R so that this relay drops off and opens its contacts $r_1$ and $r_2$.

The same delayed storer pulse, supplied from contact $m_1$ of the computer control shaft 381 through lead 1022—1022 when the debit monitor is still in second position, passes from the debit monitor through line 1029—1029 to the motor-key monitor, still in its base position, and thence through the stepping magnet MM. Stepping magnet MM advances the motor-key monitor to second position in the manner described above with reference to Fig. 4.

As mentioned, the punchings in the head portion of the account card are scanned and entered into the machine by the scanning assembly. This includes a checking of the card as to whether its identifying data, such as the account number, are identical with the corresponding data posted into the keyboard by the operator. If the card is correct, the above-mentioned checking-relay contact $r_6$ (Fig. 6, middle right) closes and passes a positive pulse through lead 1030—1030 to the motor-key monitor now in second position, and thence through lead 1031—1031 to the stepping magnet KM of the evaluating monitor, so that magnet KM advances the evaluating monitor to second position.

After the amount-storing assembly (Fig. 5) has been cleared by operation of the clearing magnet CLM, the operator can commence to post into the machine any explanations or legends relating to the previously posted amount of the transaction (horizontal top row in the chart shown in Fig. 7).

The evaluating monitor, now in its second position, passes a starting pulse through lead 1032—1032 to the card-travel control magnet KUM which, as explained, initiates an advancing travel of the account-card conveying means that pass the card from one processing location to the other. Simultaneously, the evaluating monitor, in second position, applies voltage through lead 1010—1010 to the reversing contacts of the line finder 961 (Fig. 6, middle right). The line selector switch ZW, driven together with the conveying travel of the card, scans by means of its rotating contact arm the respective switch contacts 961 correlated to the individual lines of data on the account card and, in the last-entered line of data, passes the voltage pulse, received from the evaluating monitor, through lead 1041 to the stopping magnet S$t$M. This stops the travel of the card-conveying means, and the card now has its last-entered line of data located beneath the scanning device (Fig. 3) of the machine. Simultaneous with the foregoing operation, the evaluating monitor, in its second position, passes energizing current through lead 1034—1034 to the control magnet 1035 (Fig. 6, left middle) of the computer assembly 300. The magnet 1035 then causes the account number to be entered from the scanning assembly into one of the storer mechanisms of assembly 300.

The delayed storer pulse further passes from contact $m_1$ and lead 1022—1022 to the evaluating monitor, now in its second position, and thence through lead 1026—1026 to the scanner control magnet ZSM which causes a new operating cycle of the scanner in order to receive the old balance from the last-entered line of data on the account card located beneath the scanning device. The above-mentioned switching of the evaluating monitor, effected by its stepping magnet KM due to the excitation received by the delayed storer pulse through lead 1022—1022, takes place simultaneously with the last-mentioned actuation of the scanner control magnet ZSM.

When the evaluating monitor reaches its third position (see also Fig. 7), it energizes the stepping magnet PM of the multiple-item monitor in a circuit extending from the plus pole in the evaluating monitor through lead 1047—1047 to the closed contact $k_{21}$ of the depressed multiple-item key S$ta$—, and thence through lead 1048—1048 to magnet PM and the minus pole. Magnet PM advances the multiple-item monitor to second position. The multiple-item monitor is so wired, that its contact spoons (1550 to 1554 in Fig. 4) arrive at the base position already after two switching steps. The multiple-item monitor, therefore, has only two different switching positions 1/3 and 2/4 (Figs. 6 and 7). By operation of the multiple-item monitor, called by means of the depressed multiple-item key S$ta$—, the accounting operation released by this control key is given the character of a multiple-item accounting as will be more fully explained hereinafter, whereas if the multiple-item monitor were not called and hence were left in its base position 1/3, the accounting operation performed by the machine would have the character of a single-item accounting.

In the third position of the evaluating monitor, it passes a positive pulse through lead 1036—1036 to the control magnet 1037 (Fig. 6, middle left) in the computer control assembly 300, which magnet causes the scanned old balance to be entered from the scanning assembly into the computing and storing mechanisms of the machine. This is done under control by the computer control shaft 381 which, by the same pulse, is released for another single-turn revolution. Near the end of this revolution the contact $m_1$ of computer control shaft 381 passes another delayed storer pulse through lead 1022—1022 to the evaluating monitor and its stepping magnet KM so that this monitor advances to fourth position. Before this happens, and while the evaluating monitor is in third position, the arriving delayed storer pulse also passes in the evaluating monitor through lead 1032—1032 and thence to the card-travel control magnet KUM (Fig. 6, lower right) which again initiates another travelling motion of the card-conveying means. The evaluating monitor, which in the meantime has reached its fourth position, applies through lead 1038—1038 a positive pulse to the line finder ZW, which, as mentioned, is driven simultaneously with, and in dependence upon, the travelling motion of the card conveyor. As soon as the contact arm of line finder selector ZW has reached the one bank contact connected with the lead 1038, the starting pulse arriving from the evaluating monitor is passed through lead 1041 to the stopping device S$t$M. This stops the card conveyor so that the account card is now located with a new vacant line beneath the printing devices of the accounting machine. Simultaneously, the evaluating monitor, now in fourth position, passes a pulse through lead 1039—1039 to the control magnet 1040 in the printer assembly 200. The control magnet 1040, thus excited, releases the printer control shaft 228 for a single-turn revolution and causes the old balance and the account number, sensed-off from the account card, to be imprinted upon the journal or other paper located in the journal-printer assembly (200, Fig. 1). Shortly before completion of its revolution, the printer control shaft 228 closes its contact 216 (Fig. 6, lower left corner). This passes a positive stop pulse through lead 1046—1046 to the evaluating monitor, now in fourth position, and excites the stepping magnet KM which advances the evaluating monitor to base position. While the evaluating monitor was still in its fourth position, it passed through lead 1042—1042 a current through the multiple-item monitor and lead 1043—1043 to the motor-key monitor and its stepping magnet MM, so that the motor-key monitor advanced to third position.

As mentioned above, the operator can commence posting into the keyboard any desired accounting legends immediately after the clearing magnet CLM has released the control keys, this being indicated by signal lamp L3 (Figs. 1, 3). When the posting of accounting legends (second posting in top row of Fig. 7) is completed, the operator temporarily depresses the motor key MT (Fig. 7; Fig. 6 top) so that contact $k_{66}$ of motor key MT closes a short interval of time, whereafter the motor key MT immediately returns to its normal position. Closed contact $k_{61}$ now causes another response of the motor-key relay M$t$R from the plus pole in the motor-key monitor, now in third position, through lead 1049—1049, contact $k_{66}$, lead 1004, closed contact $l_1$ lead 1005, M$t$R, (—). The motor-key relay M$t$R again closes its contacts $r_1$ and $r_2$. Thereafter, the relay M$t$R remains energized through its self-holding circuit now closed by contact $r_2$. Contact $r_1$ passes a positive starting pulse through lead 1007 to the motor-key monitor, now in third position, and thence through lead 1050—1050 to the debit monitor and its stepping magnet $HM_1$ which causes the debit monitor to advance to fourth position. It will be remembered that the debit monitor was selected by actuation of the multiple-item debit key S$ta$—. Had the multiple-item credit key S$ta$+ been actuated thus selecting the credit monitor, the just-mentioned pulse would have passed through the credit monitor and its stepping switch $HM_2$ in the same manner as described above with reference to the debit monitor.

In the fourth position now reached by the debit monitor, it passes through lead 1053—1053 a starting pulse to the control magnet 1054 in the printer assembly which releases a single-turn revolution of the printer control shaft 228 whereby the posted amount and the accounting legends of the transaction are imprinted from the storers of the machine onto the journal or other paper in the journal-printer assembly 200 and also upon the account card in the card-printer assembly 800. Simultaneous with this operation, the debit monitor, in fourth position, passes current through lead 1056—1056 to the motor-key monitor and its stepping magnet MM, thus causing the motor-key monitor to advance to fourth position. When the printer control shaft 228 is about to complete its revolution, the contact 216 is again closed and passes a positive pulse through lead 1046—1046 to the debit monitor and through its stepping magnet $HM_1$, so that the debit monitor is advanced to base position. The just-mentioned stop pulse, passing through contact 216 and lead 1046 in the fourth position of the debit monitor, also passes from the debit monitor through lead 1028—1028 to the clearing magnet CLM which, when excited, opens the clearing contact $l_1$ for a short interval of time and simultaneously clears the magnitude storer (Fig. 5) of the legends previously posted into the keyboard. The opening of clearing contact $l_1$ interrupts the self-holding circuit of the motor-key relay M$t$R so that relay M$t$R drops off.

The above-mentioned stop pulse from the printer control assembly also passes through lead 1046—1046 to the debit monitor, now in fourth position, and thence through lead 1058—1058 to the clearing magnet OLM (Fig. 6, left upper corner) which, when excited, releases the above-mentioned mechanical locking of the control key S$ta$— so that the depressed control key returns to its normal position. As a result, the previously closed contacts $k_1$, $k_{11}$, $k_{21}$ again resume the normal position shown in Fig. 6. The advanced multiple-item monitor also passes a starting pulse through lead 1059—1059 to the motor-key monitor and through its stepping magnet MM, so that this magnet advances the motor-key monitor to base position.

The entering of the first multiple-item transaction is now completed. The account card is still being retained in the machine and not yet accessible from the outside. There has been no calculation and registering of a new balance. All movable switching devices of the programming apparatus 1000, with the exception of the multiple-item monitor, called by means of the depressed multiple-item debit key S$ta$—, now again occupy their respective base positions, and another accounting operation can be performed. The above-described operations are identified in the diagram of Fig. 7 by the partial sequences denoted by A.

Now assume that the next item, to be entered and registered in the course of a multiple-item transaction, is a credit item. The amount of this item is first posted into the machine by the operator with the aid of the amount keys 1 (third posting in top row of Fig. 7). Thereafter the operator depresses the multiple-item credit key S$ta$+. This causes the following switching operations to take place.

The depressed key S$ta$+ closes its contact $k_3$, $k_{13}$, $k_{23}$. Closed contact $k_3$ energizes the motor-key relay S$t$R in a circuit extending from the motor-key monitor in base position, through lead 1001—1001 to the credit monitor in base position, and thence through lead 1002—1002 to the debit monitor, also in base position, and further-through lead 1003—1003 and contact $k_3$, lead 1004, closed contact $l_1$, and lead 1005 to relay M$t$R. Relay M$t$R picks up and remains sealed-in through its self-holding circuit now closed by contact $r_2$, until this circuit is opened by excitation of the clearing relay CLM through lead 1028. The closed contact $r_1$ passes a starting pulse through lead 1007, the motor-key monitor in base position, thence through lead 1008, closed contact $k_{13}$ of the multiple-item key S$ta$+, and lead 1012—1012 to the credit monitor and its stepping magnet $HM_2$. Magnet $HM_2$ advances the credit monitor to second position. The credit monitor now controls the operations required for entering the credit transaction previously posted. This takes place as follows.

The credit monitor, now in second position, passes a positive pulse through lead 1021—1021 to the control magnet 1011 in the computer assembly 300. Control magnet 1011 causes the posted amount of transaction to be entered into the correlated computing and storing devices of the computer assembly in the positive sense, i.e. as a cerdit amount. Simultaneously, a positive pulse passes from the credit monitor in second position, through lead 1013—1013 to the multiple-item monitor now in its second position (2/4, see also Fig. 7) and thence through lead 1032—1032 to the card-feeder control magnet KUM which, in the manner already described, releases a travelling motion of the card conveyor. The motor-key monitor, still in base position, passes a positive pulse through lead 1064—1064 to the line-finder selector switch ZW (Fig. 6, right middle) that is to the one bank contact coordinated to the line No. 1 of the card. As described, the contact arm of switch ZW is driven in synchronism with the conveying travel of the card. Consequently, when the line-finder arm has performed one advancing step, it already passes the current pulse, arriving through lead 1064, through lead 1041 to the stopping device S$t$M which thus stops the card shortly after it has commenced its travel. As a result, the account card has advanced only to the extent needed to place the new, vacant data line of the card beneath the printing members of the machine. The just-mentioned positive pulse, occurring when the selector switch ZW places its arm on the first bank contact corresponding to line No. 1 of the card, was not effective during the initial accounting operation previously described because at that time a card-conveying travel was not released by the motor-key monitor then in its base poistion.

It has been mentioned above that the control magnet 1011 in the computer control assembly 300 causes the posted amount of transaction to be entered into the computing and storing devices. This entering operation is controlled by the control shaft 381 of the computer control assembly. Shortly before computer control shaft 381 terminates its single-turn revolution, it issues the above-mentioned delayed storer pulse by closing the contact $m_1$. The pulse passes through lead 1022—1022 to the credit monitor and its stepping magnet $HM_2$ which advances the credit monitor to third position. Simultaneously the delayed storer pulse passes through the credit monitor, now in second position, and through lead 1029—1029 to the motor-key monitor and its stepping magnet MM which advances the motor-key monitor to second position. The same delayed storer pulse passes from the credit monitor through lead 1028—1028 to the clearing magnet CLM, thus energizing the magnet CLM for a short interval of time. As a result, the clearing contact $l_1$ opens and causes clearing of the amount-storing devices (Fig. 5) which return to zero position. The temporary opening of clearing contact $l_1$ interrupts the self-holding circuit through contact $r_2$ thus causing the motor-key relay M$t$R to drop off.

The evaluating monitor, now in base position, passes a pulse through lead 1042—1042 to the multiple-item monitor, now in second position (2/4), which passes the same pulse through lead 1043—1043 to the motor-key monitor and through stepping magnet MM which switches the motor-key monitor to third position.

Now, after the keyboard 1 has been cleared by operation of the magnet CLM described above, the operator can post into the keyboard the accounting legends appertaining to the previously posted amount of the transaction (fourth posting in top row of Fig. 7). When the legends are posted, the operator again actuates the motor key MT which causes the posted legends to be entered into the machine. Simultaneously, the motor key MT causes the programmer 1000 to continue its operating sequence and to perform the following individual switching operations.

The motor-key monitor, now in third position, passes a positive pulse through lead 1049 and the temporarily closed contact $k_{66}$ of the depressed motor key MT, thence through lead 1004 and closed contact $l_1$ to the motor-key relay M$t$R. Relay M$t$R picks up and closes its contact $r_1$ and $r_2$, thereafter remaining sealed-in through the self-holding circuit of contact $r_2$. Contact $r_1$ passes a switching pulse through the stepping magnet $HM_2$ of the credit monitor in a circuit extending from contact $r_1$ through lead 1007 to the motor-key monitor now in third position, and thence through lead 1050—1050 to the credit monitor and its stepping magnet $HM_2$. Magnet $HM_2$ now advances the credit monitor to fourth position.

In the fourth position of the credit monitor, it passes current through lead 1052—1052 to the control magnet 1055 (Fig. 6, lower left) in the printer assembly (200, 800). This magnet, as mentioned above, releases the printer control shaft 228 for a single-turn revolution. Control shaft 228 causes the posted credit transaction as well as the appertaining accounting legends stored in the storing devices of the machine, to be imprinted in the journal-printing assembly 200 and also on the account card located at the card-printing assembly 800 of the machine.

Also, in the fourth position of the credit monitor, this monitor passes a switching pulse through lead 1056—1056 to the motor-key monitor and through the stepping magnet MM which causes the motor-key monitor to advance to fourth position. The stop pulse issued by contact 216 shortly before the printer control shaft 228 completes its revolution, passes through lead 1046—1046 to the credit monitor and through its stepping magnet $HM_2$ so that the credit monitor is advanced to base position. The same stop pulse passes simultaneously through the credit monitor, still in fourth position, and thence through lead 1028—1028 to the clearing magnet CLM and also through the credit monitor and lead 1058—1058 to the clearing magnet OLM (Fig. 6, upper left). The clearing magnet CLM causes the motor-key relay M$t$R to drop off and also clears the amount-storing devices (Fig. 5) in the manner already described. The clearing magnet OLM releases the previously depressed multiple-item credit key S$t$a+ which returns to normal position. The multiple-item monitor, in position 2/4, passes a switching pulse through lead 1059—1059 to the motor-key monitor and its stepping magnet MM, so that the motor-key monitor is advanced to base position.

The second accounting operation is now completed. The account card still remains inside the machine, and the machine is ready for the posting of another item in continuance of the multiple-item accounting in progress.

The second accounting operation above described comprises the steps occurring within the partial sequence denoted by B in the chart of Fig. 7. This sequence B includes only two of the sub-sequences $a$ and $c$ of the first accounting operation A, whereas the sub-sequence $b$ of the first accounting operation, including the finding of the first vacant line on the card and the entering of the account number and old balance, is suppressed in the sequence B.

Any further individual transactions required for the multiple-item run may now be posted and processed in the machine in the same manner as described above with reference to the second accounting operation. Each of such subsequent operations will correspond to the accounting sequence B in Fig. 7 as fully described above. However, when the operator reaches the last item to be posted, then the machine operation must be released by actuating, not one of the above-mentioned multiple-item keys S$t$a— or S$t$a+, but by depressing one of the single-item keys UT— or UT+, depending upon whether the last item is to be entered as a debit or credit.

Assume that the last item of the multiple-item transaction is a credit transaction and that the operator, after posting the amount of the last transaction, has actuated the proper key UT+. Then the following operation of the programmer 1000 (Fig. 6) will take place.

The motor-key monitor passes from its plus pole a switching pulse through lead 1001—1001 to the credit monitor, in base position, thence through lead 1002—1002 to the debit monitor now also in base position, thence through lead 1003—1003 to the closed contact $k_4$ of the actuated single-item key UT+, and through lead 1004, closed contact $l_1$, and lead 1005 to the motor-key relay M$t$R. Relay M$t$R picks up and holds itself sealed-in through contact $r_2$. Closed contact $r_1$ of relay M$t$R passes a starting pulse through lead 1007 to the motor-key monitor, still in base position, thence through lead 1008, closed contact $k_{14}$ and lead 1012—1012 to the credit monitor and through its stepping magnet $HM_2$. Magnet $HM_2$ advances the credit monitor to first position.

Now the operator posts the amount of the last-item transaction (fifth posting in top row of Fig. 7), and this amount is entered in the manner already described above, until the motor-key monitor, receiving a pulse through lead 1029, passes to second position and the credit monitor, receiving a pulse through lead 1022, passes to third position. In the second position of the motor-key monitor, a switching pulse passes from this monitor through lead 1070 to closed contact $k_{24}$ of the depressed single-item key UT+ and through lead 1071—1071 to the multiple-item monitor, now in switching position 2/4 (see Fig. 7). Thence the pulse passes through the stepping switch magnet PM and advances the multiple-item monitor to base position (1/3). Consequently, the actuation of the single-item key UT+ has the effect that the multiple-item monitor, which governs the sequence of machine operations required for multiple-item accounting, is switched back to base position so that the sequential functions initially performed as multiple-item run now assume the character of single-item accounting. Before the multiple-item monitor is returned to its base position as just described, a switching pulse coming from the evaluating monitor, now in base position, through the lead 1042—1042 passes in the multiple-item monitor through lead 1043—1043 to the motor-key monitor and its stepping magnet MM, so that the motor-key monitor is advanced to its third position just before the multiple-item monitor resumes its base position.

In the meantime, the operator has posted on keyboard 1 the legends correlated to the last-posted amount (sixth posting in Fig. 7), and has thereafter actuated the motor key MT. As repeatedly described above, the motor key MT passes a starting pulse to the motor-key relay M$t$R. This pulse passes from the motor-key monitor, now in third position, through lead 1049, closed contact $k_{66}$, lead 1004, closed contact $l_1$, and lead 1005 to relay M$t$R. Relay M$t$R picks up and maintains itself sealed-in through its contact $r_2$. The contact $r_2$ of relay M$t$R passes a switching pulse through lead 1007 and the motor-key monitor, in third position, and thence through lead 1050—1050 to the multiple-item monitor now in base position (1/3, see Fig. 7). Thence the pulse passes through lead 1073—1073 (Fig. 6) to the discriminating monitor and its stepping magnet BM. Magnet BM advances the discriminating monitor to second position. The same switching pulse is supplied by lead 1050 to the credit monitor and its stepping magnet HM$_2$. Hence the credit monitor passes to fourth position. The credit monitor, in fourth position, controls the printing of the entered amount and legends of the transaction in the manner described, and passes a switching pulse through lead 1056—1056 to the motor-key monitor and the stepping magnet MM which advances the motor-key monitor to fourth position. The clearing magnets CLM and OLM become energized through respective leads 1028 and 1058 so that these magnets, as described, cause the motor-key relay M$t$R, the amount-storing devices (Fig. 5) and the depressed control key UT+ to return to normal position.

During the above-mentioned printing of the transaction, the discriminating monitor, then in second position, passes a switching pulse through lead 1074—1074 to the control magnet 1075 in the computer control assembly 300 (Fig. 6, middle left). The control magnet 1075 releases the computer control shaft 381 for a single-turn revolution and causes the computer to calculate the new balance and to enter this balance into the correlated data-storing devices. The delayed storer pulse produced by operation of the computer control shaft 381 passes from contact $m_1$ through lead 1022—1022 to the evaluating monitor and the stepping magnet KM, thus advancing the evaluating monitor to third position. The discriminating monitor, now also in third position, passes current through lead 1076—1076 to the control magnet 1077 in the printer assembly. Magnet 1077 releases the printer control shaft 228 for a single-turn revolution and causes imprinting of the new balance in the manner already described.

The stop pulse produced by operation of the printer control shaft 228 passes from contact 216 through lead 1046—1046 to the discriminating monitor and its stepping magnet BM, so that the discriminating monitor is now advanced to the fourth position. The same stop pulse, arriving through lead 1046 while the discriminating monitor is still in third position, also passes from the discriminating monitor through lead 1032—1032 to the card-feeder control magnet KUM which now initiates a new travelling motion of the account card. The same stop pulse in lead 1046 of the discriminating monitor passes through lead 1078—1078 to the reverse-feeder control magnet ALM which causes a reversal in the travelling direction of the card conveyor released for operation by the card-feeder control magnet KUM. A positive pulse supplied from the discriminating monitor, now in third position, through lead 1100—1100 to the line-finder switch ZW (Fig. 6, middle right) passes through lead 1041 to the stopping device S$t$M so that the card is stopped in the desired position. Now, the account card is in a position where the line last previously imprinted is located beneath the punching assembly so that the new balance, computed and stored in the computer assembly 300, is entered onto the account card in form of scannable code holes.

The discriminating monitor which in the meantime has reached fourth position, passes a positive pulse through lead 1063—1063 to the puncher-control magnet LoM in the puncher control assembly 600 (Fig. 6, lower right corner). Magnet LoM releases the puncher control shaft 650 for a single-turn revolution. During this rotation, the shaft 650 controls the above-described operations for punching the computed new balance into the account card. During such registration of the new balance, the last line of the card occupied by transaction data is provided with a special mark or punched hole which, during a subsequent accounting operation, serves to cooperate with the line-finder device 961 for locating the last-entered line of data.

Shortly before the puncher control shaft 650 completes its revolution, it actuates the contact 680 and passes a stop pulse through lead 1066—1066 to the discriminating monitor where this pulse initiates the following operations.

In the discriminating monitor, the just-mentioned pulse passes from lead 1066 to lead 1079—1079 and thence through the ejector control magnet ABM of the card-feeder control assembly 860, where the magnet ABM causes the processed account card to be discharged from the machine. The stop pulse also passes from the discriminating monitor through lead 1080—1080 to the multiple-item monitor, now in base position, and thence through lead 1059—1059 to the motor-key monitor and its stepping magnet MM which advances the motor-key monitor to base position. The same stop pulse passes in the discriminating monitor through the stepping magnet BM which advances the discriminating monitor to base position.

The multiple-item transactions are now terminated. The completely processed account card is discharged, and all movable components of the machine and the programming apparatus again resume their respective base positions.

The individual operations described above with reference to the posting and registering of the last transaction item comprise the sequence denoted by C in Fig. 7. It will be recognized that this sequence includes the same sub-sequences $a$ and $c$ that occurred during the preceding individual accounting sequences A and B, but that another sub-sequence $d$ took place for the purpose of terminating the accounting by computing and registering a new balance and thereafter releasing the account card from the machine.

Single-item accounting operations are initiated by depressing one of the control keys UT+, UT— of the keyboard group 1$a$ (Figs. 3, 6), depending upon whether a credit or debit accounting is involved. When after the posting of the transaction amount the machine operation is released by actuating one of the keys UT+ and UT—, then the amount of transaction is entered into the selected computing and storing devices, the account card is conveyed from the outside into the machine, the account card is checked as to correctness of its account number, the data represented by the head punchings of the card are scanned and stored, and the card is conveyed to the last-entered line of data and the old balance is scanned off the card in the same manner and under control by the same programming devices as described in detail above with reference to an example of multiple-item accounting. After clearing the data-storing devices by means of the clearing magnet CLM, the operator can post the transaction legends into the machine, whereafter he depresses the motor key MT in order to issue the starting pulse for the continuance of the accounting operation. (See also Fig. 7.)

It will be remembered that during multiple-item operation when one of the keys $Sta+$ and $Sta-$ is depressed, the multiple-item monitor receives a switching pulse through lead 1048—1048 through the contact $k_{21}$ or $k_{23}$ of key $Sta-$ or $Sta+$, lead 1047—1047 and the evaluating monitor then in second position. Now, however, that is when neither contact $Sta-$ nor contact $Sta+$ is de-depressed, this switching pulse does not reach the stepping magnet PM of the multiple-item monitor so that this monitor remains in base position. As a result, all further sequences of operation required for terminating the accounting operation, such as the printing of the legends and of the transaction amounts, the computation of the new balance, the printing and punching of the new balance as well as the discharging of the account card and the resetting of all monitors into base position, take place in exactly the same manner as described above with reference to the last transaction item of the multiple-item accounting entered into the machine by actuation of the single-item key $UT+$.

Referring to the chart of Fig. 7, it will be recognized from the foregoing that a single-item accounting operation, released by the control key $UT+$ or $UT-$, is composed of the following four sub-sequences.

Sub-sequence $a$: posting of the amount of transaction, and passing the account card into the machine;

Sub-sequence $b$: scanning of the head punchings, checking of the posted account number with that punched into the card, transferring the card to the last-entered line of data, scanning-off the old balance, and passing the card to the next vacant line to be imprinted;

Sub-sequence $c$: printing of amounts and legends of the transaction;

Sub-sequence $d$: totalizing the new balance, printing of new balance, transfer of card to punching position, punching of new balance, and discharging of the card.

These sequences take place in uninterrupted succession in response to actuation of one of the control keys $UT+$ and $UT-$, with the exception of the interval in which the transaction legends are posted by the operator. This interval is terminated by the operator depressing the motor-key MT but need not require an interruption of the programming operation which automatically continues up to the termination of the entire series of sequences.

When releasing an accounting operation by means of one of the multiple-item keys $Sta+$ or $Sta-$, the above-mentioned programming sequence is interrupted because, as explained above, the actuation of the multiple-item key causes the multiple-item monitor (Fig. 6) to be inserted for operation within the described total sequence. Now, the first accounting operation released by actuation of key $Sta+$ or $Sta-$ comprises the sequence A (Fig. 7) composed of the sub-sequences $a$, $b$, $c$; the second accounting operation and each following one released by the multiple-item key $Sta+$ or $Sta-$ comprises the sequence B which includes the sub-sequence $a$ (with the exception of the passage of the card into the machine) and the sub-sequence $c$; whereas the terminating accounting operation released by means of one of the single-item keys $UT+$, $UT-$ comprises the sequence C which is composed of the sub-sequence $a$ (with the exception of the card transfer into the machine), and of the sub-sequences $c$ and $d$.

Consequently, the multiple-item monitor has the effect that the inherently permanently interwired programming monitors in the programming assembly 1000, are connected in a diversified manner so as to perform new functioning sequences during which any switching sequences that are superfluous for a particular operation are suppressed. As a result, the functioning sequences selectively released by the control keys $UT+$, $UT-$, $Sta+$, $Sta-$ can take place in continuous succession without any idling periods. As a result, the speed of a complete accounting operation is greatly increased, aside from the fact that an extremely simple control operation on the part of the operator is required and the number of control keys necessary for this purpose is advantageously reduced.

The multiple-item monitor is switched into operation through the evaluating monitor when in third position, but this happens only if and when a shortened accounting run, namely sub-sequence $c$ comprising the printing of amounts and legends of the transaction, is to take place; and occurs only after completion of all those evaluating activities which, under control by the evaluating monitor, are performed only once with each account card inserted into the machine. When starting an accounting operation with a new account card in which all data lines are still vacant, then the multiple-item monitor is occupied only after completing all entering operations that are to occur only once; that is, after all preparatory entries have been made by means of another monitor (not illustrated) which becomes active instead of the evaluating monitor (with the exception of the totalizing operation for determining the new balance as well as the registering of the new balance in print and by punching). If desired, other monitors may be temporarily made active instead of the evaluating monitor, such as a transfer monitor (not shown) which controls the transfer of a fully entered card onto a new card, such insertion of auxiliary monitors being effected automatically by machine control means similar to those described. In this case, also the multiple-item monitor is switched on only after all non-repetitive operations, with the exception of those of sub-sequence $d$, have been completed.

It will be apparent to those skilled in the art, upon studying this disclosure, that my invention permits of various modifications with respect to components and circuitry as well as numerous design details of the accounting machinery to which the programming apparatus is applied, without departing from the essential features of my invention and within the scope of the claims annexed hereto.

I claim:

1. With an accounting machine having card-conveying, data-entering, computing, and registering assemblies each of which has a given cycle of operation releasable by a control pulse, the combination of a programming apparatus for operatively correlating said assemblies in accordance with selected sequential accounting runs, said programming apparatus comprising selectively actuable control keys for selecting the desired accounting run; sequencing monitor means connected with said assemblies for supplying said control pulses; a group of said monitor means being connected with and governed by a first group of said keys for controlling said assemblies to normally perform a given complete accounting run; other ones of said monitor means being connected with and governed by a second group of said keys and being in controlling connection with a given smaller number of said assemblies than required for said complete accounting run, whereby actuation of a second-group key releases another selected but incomplete accounting run; said other monitor means when actuated by said second-group key being in operative connection with selected ones of said smaller number of assemblies so as to suppress, upon next actuation of a second-group key, part of the incomplete run for adding to the first incomplete run only the assembly operations required for its continuance; and said other monitor means being interposed between said monitor group and selected ones of said assemblies normally controlled by actuation of a first-group key, whereby said incomplete accounting run is terminable by actuation of a first-group key and said other monitor means are then active to suppress all but those assembly operations of said complete run as are needed to conclude said incomplete run.

2. With an accounting machine having card-conveying, data-entering, computing, and registering assemblies each of which has a given cycle of operation releasable by a control pulse, the combination of a programming apparatus for operatively correlating said assemblies in accordance with selected sequential accounting runs, said programming apparatus comprising selectively actuable control keys for selecting the desired accounting run; a group of switching monitors each having a sequence of switch positions and having control leads connecting said monitor in said respective positions with different ones of said assemblies for supplying said control pulses thereto; a first group of said control keys being in controlling connection with said monitors for causing them to control said assemblies to perform a selected complete accounting run depending upon which of said first-group keys is actuated; another switching monitor connected in a selected number of said control leads and having one switching condition in which said leads are closed and another switching condition in which said leads are interrupted, said first-group keys being also in controlling connection with said other monitor, and said other monitor being in said one switching condition upon actuation of a first-group key; a second group of said keys in controlling connection with said group of monitors and also with said other monitor for placing said other monitor in said other switching condition, whereby selective actuation of said second-group keys releases a selected but incomplete accounting run continuable by repetitive actuation of said second-group keys and terminable by ultimate actuation of a first-group key which places said other monitor back to said one switching condition.

3. With an accounting machine having card-conveying, data-entering, computing, and registering assemblies each of which has a given cycle of operation releasable by a control pulse, the combination of a programming apparatus for operatively correlating said assemblies in accordance with selected sequential accounting runs, said programming apparatus comprising selectively actuable control keys for selecting the desired accounting run, said keys including single-item keys and multiple-item keys; monitor means having sequencing devices connected with said assemblies for supplying said control pulses; a group of said monitor means being connected with and controlled by said single-item keys for controlling said assemblies to normally perform a given complete accounting run; other ones of said monitor means being connected with said multiple-item keys and forming a controlling connection between said sequencing devices and a given smaller number of assemblies than required for said complete accounting run, whereby actuation of a multiple-item key releases an incomplete multiple-item run; said other monitor means when actuated by a multiple-item key being in operative connection with selected ones of said smaller number of assemblies so as to suppress, upon next actuation of a multiple-item key, the initial part of the next multiple-item run for adding to the preceding run only the assembly operations needed for its continuance, and said other monitor means being interposed between said monitor group and selected ones of said assemblies normally controlled by actuation of a single-item key, whereby said multiple-item runs are terminable by actuation of a single-item key and said other monitor means are then active to suppress all but those assembly operations of said single-item run as are needed for concluding said incomplete multiple-item run.

4. With an accounting machine having card-conveying, data-entering, computing, and registering assemblies each of which has a given cycle of operation releasable by a control pulse, the combination of a programming apparatus for operatively correlating said assemblies in accordance with selected sequential accounting runs, said programming apparatus comprising selectively actuable control keys for setting the desired accounting run, said keys including single-item keys and multiple- item keys; sequencing means having a succession of switching conditions in which said sequencing means are sequentially connected with a first-operating number of said assemblies including data-entering and data-registering assemblies, and said sequencing means when in subsequent switching condition being sequentially connected with a last-operating number of said assemblies including a balance-computing assembly, circuit means connecting said single-item keys with said sequencing means for controlling said sequencing means to normally release said assemblies for a complete accounting sequence; a selective monitor device having normally closed contacts interposed between said sequencing means and said last-operating assemblies; further circuit means connecting said multiple-item keys with said sequencing means, said selective monitor device having a control circuit connected wth said multiple-item keys through said sequencing means when said sequencing means are in a given condition subsequent to operation of said first-operating assemblies, whereby actuation of any one of said multiple-item keys causes said selective monitor device to open said contacts when said sequencing means reach said given condition to disconnect said last-operating assemblies from said sequencing means so that an incomplete multiple-item run is performed, said single-item keys being connected with said control circuit for resetting said selective monitor device to re-connect said last-operating assemblies with said sequencing devices, whereby said incomplete multiple-item run is terminable by actuating one of said single-item keys.

5. In a programming apparatus according to claim 4, said first-operating assemblies comprising a card-conveying assembly for passing an account card into scanning position, and a scanning assembly for entering previously registered data from the card into the machine, said selective monitor device being also interposed between said sequencing means on the one hand, and said conveying assembly and said scanning assembly on the other hand, so as to disconnect said latter two assemblies from said sequencing means when opening said contacts, whereby upon repeated actuation of said multiple-item keys the card-conveying and scanning assemblies also remain inactive.

6. In a programming apparatus according to claim 4, said last-operating assemblies comprising balance-computing and card-ejecting assemblies having respective control leads connected with said sequencing means through said selective monitor device, whereby said latter assemblies are disconnected from said sequencing means when said selective monitor device is in contact-opening position by actuation of a multiple-item key.

7. In a programming apparatus according to claim 4, said sequencing means comprising a sequencing switch and said control keys comprising a motor key connected with said sequencing switch for controlling it to move to a transaction-entering position; said card-conveying assembly being connected through said sequencing switch, when in said position, with said selective monitor device for having said latter device release said card-conveying assembly to displace the account card an amount of travel controlled by said sequencing switch.

8. A programming apparatus according to claim 4, said sequencing means comprising a main sequencing monitor connected between said control keys and said other sequencing means for dominating control of said other sequencing means; said main monitor having a given sequence position in which it stops the continuance of an accounting run, selected by said single-item and multiple-item keys, for providing a data-posting interval; and another key connected with said main monitor for controlling it to resume the selected accounting run.

9. A programming apparatus according to claim 8, said main monitor being connected with and controlled by said selective monitor to pass to said transaction-entering position upon registering of a transaction previously entered under control by said multiple-item keys, whereby additional assembly operations normally performed under control by said single-item keys are suppressed.

10. In a programming apparatus according to claim 1, said sequencing monitor means comprising a credit monitor and a debit monitor connected with said computing assembly for controlling it in additive and subtractive sense respectively; each of said two groups of control keys comprising a credit key and a debit key for controlling said credit and debit monitors respectively, each of said credit and debit monitors having a circuit connected with said card-conveying assembly for controlling it to pass an account card into the machine.

11. With an accounting machine having a data-posting keyboard, storer means for storing the posted data and a number of individually operable assemblies which comprise a computer assembly, a card-feeder assembly, a card-scanner assembly, a card-puncher assembly and a printer assembly, the combination of a programming apparatus for operatively correlating said assemblies in accordance with a selected accounting run, said programming apparatus comprising selectively actuable control keys for selecting the desired accounting run; a number of electromagnets disposed in said respective assemblies and responsive to an energizing pulse for releasing said assemblies for a given cycle of operation; each of said assemblies having pulse transmitter means for issuing a control pulse at a given stage of said cycle of operation; a number of individually controllable monitor devices each having a given plurality of sequential switching stages and having control means for incrementally advancing the monitor device from one to the next switching stage in response to individual energizing pulses; first circuit means connecting said control keys with different ones of said monitor control means, second circuit means connecting said respective monitors in different monitor switching stages with different ones of said electromagnets, said pulse transmitter means being also connected with said monitor control means in selected switching stages of said monitors, whereby actuation of said respective control keys causes said monitors to control said assemblies to perform different respective operating sequences depending upon the selected control key and each controlled assembly causes its pulse transmitter means to control said monitors to release the next following assembly for operation; a first group of said control keys being connected by said first circuit means with a larger number of said monitor control means for performance of a given complete accounting run; one of said monitors being controllingly connected with a smaller number of said assemblies so as to perform a given incomplete accounting sequence, said one monitor having its control means connected with a second group of said control keys whereby actuation of a second-group key releases said incomplete sequence; said one monitor when in an off-base switching stage reached by actuation of said second-group keys being connected with only some selected ones of said smaller number of assemblies, whereby repeated actuation of a second-group key causes only said selected assemblies to add to the accounting sequence the accounting steps required for continuance of the incomplete accounting run, and said incomplete run is terminable only by actuation of a first-group key.

12. With an accounting machine having individually operable data-entering, computing, and registering assemblies, the combination of a programming apparatus for operatively correlating said assemblies in accordance with a selected accounting run, said programming apparatus comprising selectively actuable control keys for selecting the desired accounting run; a number of electromagnets disposed in said respective assemblies and responsive to an energizing pulse for releasing said assemblies for a given cycle of operation; said programming apparatus having monitor means connected with said magnets for issuing said pulses; said monitor means being connected with and governed by a first group of said control keys to control said assemblies to normally perform a given complete sequential accounting run, depending upon which of said first group of keys is actuated; other ones of said monitor means being connected with and governed by a second group of said control keys to control a given smaller number of said assemblies than required for said complete accounting run, whereby actuation of a second-group key releases another selected but incomplete accounting run; said other monitor means, when responded to actuation of one of said second-group keys, being in off-base condition and being in operative connection with selected ones of said smaller number of assemblies so as to suppress, upon next actuation of a second-group key, part of said incomplete run for adding to said run only the assembly operations required for continuance of the incomplete run; and said incomplete run being terminable by subsequent actuation of one of said first-group keys for which purpose said other monitor means are interposed between said first monitor means and the initially operative assembly controlled by said first monitor means, whereby said other monitor means when actuated by one of said second-group keys suppress the initial part of said normally complete run so that only the terminating portion of assembly operations is added to the incomplete run previously released by said second-group keys.

No references cited.